United States Patent
Benedetto et al.

(10) Patent No.: US 11,772,367 B2
(45) Date of Patent: Oct. 3, 2023

(54) LAMINATED GLAZING

(71) Applicant: Pilkington Group Limited, Nr. Ormskirk (GB)

(72) Inventors: Gustavo Benedetto, de Bisaccia (IT); Neil Winstanley, St Helens (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 0 days.

(21) Appl. No.: 17/271,372

(22) PCT Filed: Aug. 30, 2019

(86) PCT No.: PCT/GB2019/052440
§ 371 (c)(1),
(2) Date: Feb. 25, 2021

(87) PCT Pub. No.: WO2020/044061
PCT Pub. Date: Mar. 5, 2020

(65) Prior Publication Data
US 2021/0323278 A1    Oct. 21, 2021

(30) Foreign Application Priority Data
Aug. 31, 2018 (EP) .................................. 18425073

(51) Int. Cl.
*B32B 3/10* (2006.01)
*B32B 17/10* (2006.01)

(52) U.S. Cl.
CPC .. *B32B 17/10293* (2013.01); *B32B 17/10036* (2013.01); *B32B 17/10137* (2013.01);
(Continued)

(58) Field of Classification Search
None
See application file for complete search history.

(56) References Cited

U.S. PATENT DOCUMENTS

| 2004/0098946 A1* | 5/2004 | Meerman | B32B 17/10761 |
| | | | 52/786.12 |
| 2015/0110991 A1* | 4/2015 | Miwa | B32B 17/10706 |
| | | | 428/137 |

(Continued)

FOREIGN PATENT DOCUMENTS

| CN | 106938893 A | 7/2014 |
| CN | 104722925 A | 6/2015 |

(Continued)

OTHER PUBLICATIONS

GB Search Report dated Feb. 26, 2019 in corresponding British Patent Application No. GB1816450.9, 3 pgs.
(Continued)

*Primary Examiner* — Christopher M Polley
(74) *Attorney, Agent, or Firm* — BUCHANAN INGERSOLL & ROONEY PC

(57) ABSTRACT

A laminated glazing comprising first and second sheets of glass joined by an interlayer structure is described. The second sheet of glass has a first edge surface in an upper region of the laminated glazing. The first edge surface of the second sheet of glass is configured to comprise at least one region between first and second edges of the second sheet of glass such that in the at least one region the shortest distance along a straight line on the first edge surface of the second sheet of glass connecting a first point on the first edge of the second sheet of glass to a second point on the second edge of the second sheet of glass is at least 1.7 times the thickness of the second sheet of glass. A method of making the laminated glazing is also described.

20 Claims, 7 Drawing Sheets

(52) U.S. Cl.
CPC .. *B32B 17/10155* (2013.01); *B32B 17/10935* (2013.01); *B32B 17/1055* (2013.01); *B32B 2307/50* (2013.01); *B32B 2307/732* (2013.01); *B32B 2605/006* (2013.01)

(56) References Cited

U.S. PATENT DOCUMENTS

| | | | |
|---|---|---|---|
| 2015/0314571 A1* | 11/2015 | Cites | C03C 3/097 501/63 |
| 2017/0122027 A1 | 5/2017 | Bumann et al. | |
| 2017/0190152 A1 | 7/2017 | Notsu et al. | |
| 2019/0283550 A1 | 9/2019 | Notsu | |

FOREIGN PATENT DOCUMENTS

| | | | |
|---|---|---|---|
| EP | 2708355 | A1 | 3/2014 |
| EP | 3050990 | A1 | 8/2016 |
| EP | 3100854 | A1 | 12/2016 |
| EP | 3189965 | A1 | 7/2017 |
| JP | 2012-254624 | A | 12/2012 |
| JP | 2017-121804 | A | 7/2017 |
| WO | 03086996 | A1 | 10/2003 |
| WO | 2018/101428 | A1 | 6/2018 |

OTHER PUBLICATIONS

International Search Report (PCT/ISA/210) dated Nov. 29, 2019, by the European Patent Office as the International Searching Authority for International Application No. PCT/GB2019/052440, 4 pgs.
Written Opinion (PCT/ISA/237) dated Nov. 29, 2019, by the European Patent Office as the International Searching Authority for International Application No. PCT/GB2019/052440, 6 pgs.
Notification of the First Office Action issued in Chinese Patent Application No. 201980064608.1, dated Sep. 2, 2022, with English Translation (20 pages).
Office Action (Notification of Second Office Action) dated May 12, 2023, by the National Intellectual Property Administration, P. R. China in corresponding Chinese Patent Application No. 201980064608.1 and an English translation of the Office Action. (18 pages).
Office Action (Notice of Reasons for Refusal) dated Jul. 4, 2023, by the Japan Patent Office in corresponding Japanese Patent Application No. 2021-510675 and an English translation of the Office Action. (7 pages).

* cited by examiner

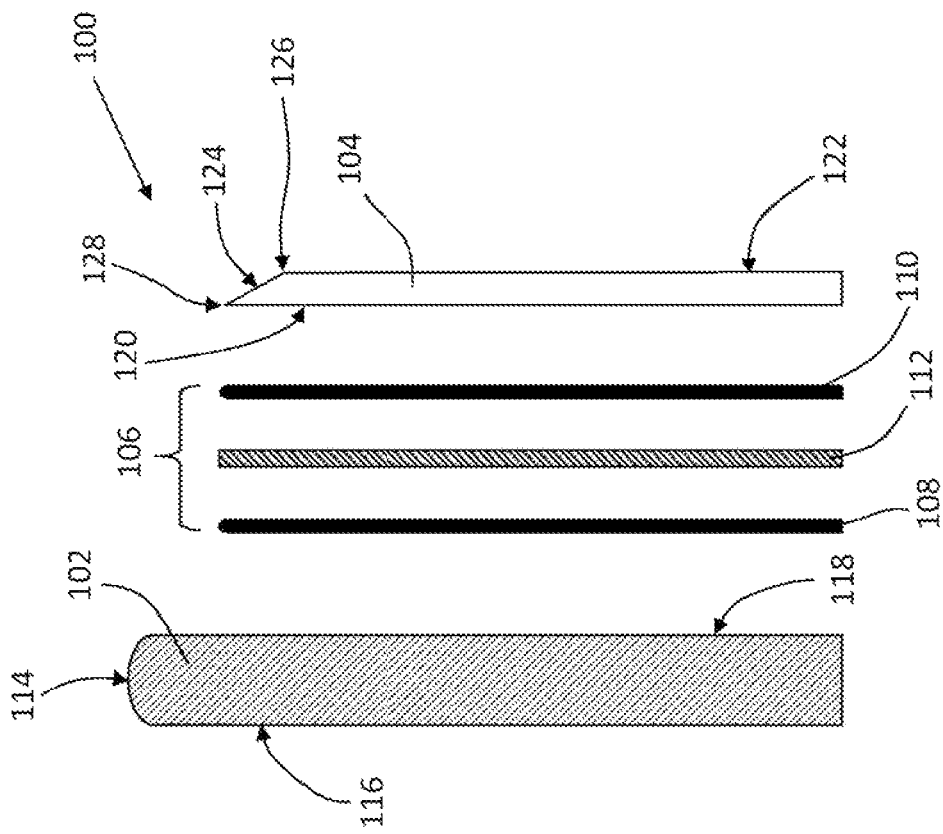
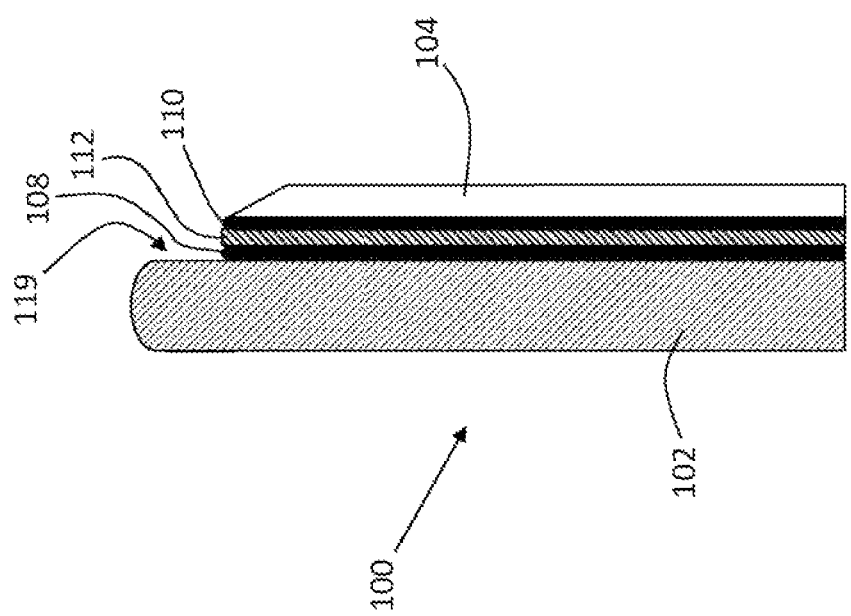

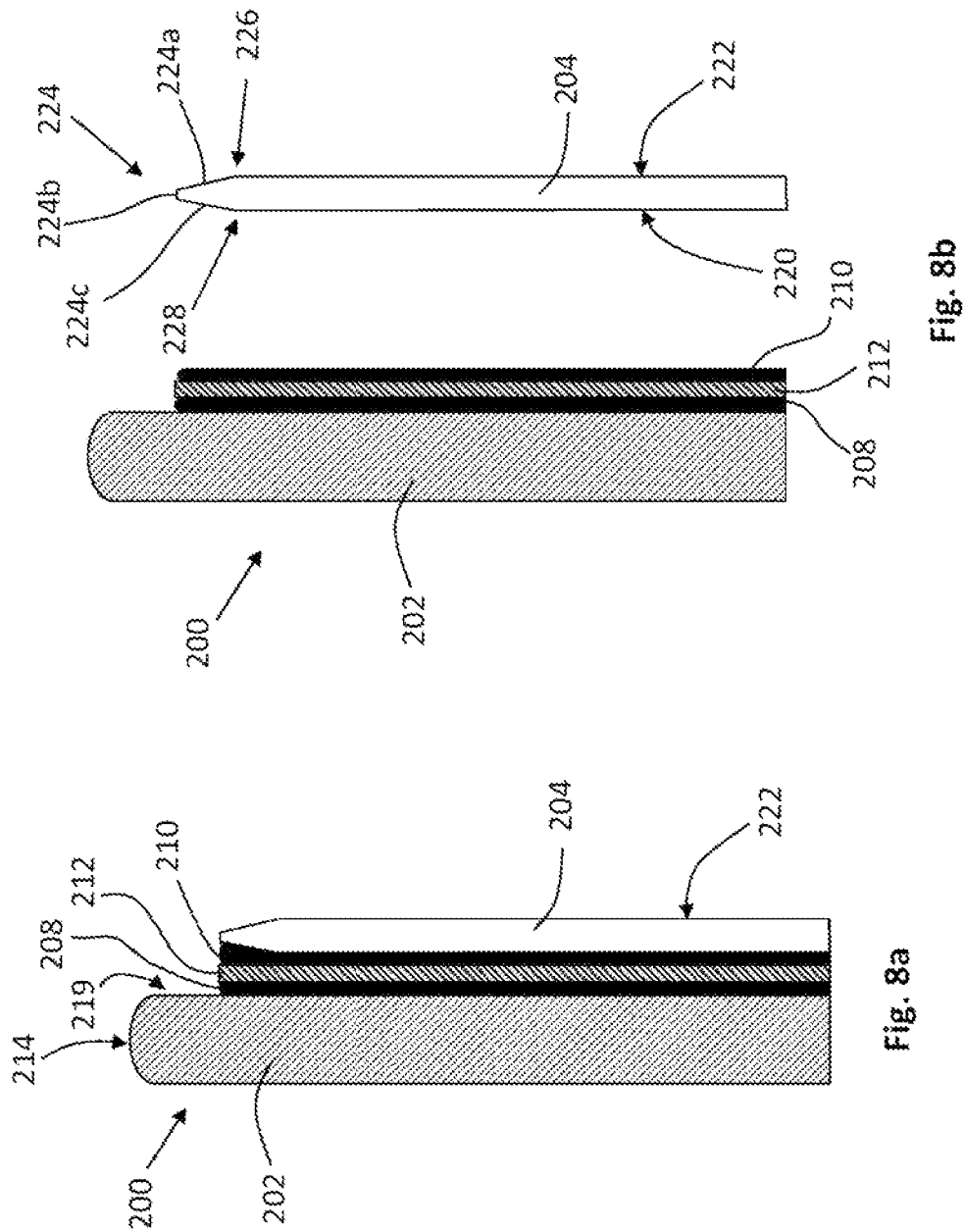

LAMINATED GLAZING

The present invention relates to a laminated glazing, in particular to a laminated glazing for use as a movable side window in a vehicle, and to a method of making a laminated glazing.

Laminated glazings are well known in the art. EP2708355A1 describes a laminate obtained by integrally laminating glass sheets on both surfaces of a resin sheet. The glass sheets have a thickness of 300 µm or less and end surfaces of the glass sheets are chamfered. WO03/086996A describes a wedged shaped glass sheet and a laminated transparency incorporating such a glass sheet. EP3100854A1 describes a laminated, bent, safety glass panel for architectural or interior uses and a method of manufacturing such panels.

It is well known that laminated glazings are used as windows in automotive vehicles. Usually the window is the vehicle windscreen, but may be a vehicle side window, rear window or sunroof. In the art a vehicle side window may be referred to as a vehicle side light. Typically, the vehicle has at least one, usually two, movable side windows, one on either side of the vehicle i.e. the passenger side and the driver side. In addition to movable side windows, there may be one or more fixed side windows, for example front or rear quarter lights.

In the driver's door there is usually a side window that is movable in a vertical direction by actuation of a suitable winder mechanism. The winder mechanism may be manually or electrically operated and has at least one element in mechanical communication with the side window to move the side window within the vehicle aperture defining the driver's side window.

Upon winding the side window down, the upper edge of the side window becomes exposed and can be seen in the vehicle aperture until the side window is fully wound down.

Upon winding the movable side window to the closed position, the upper edge region of the side window forms a seal with a suitable resilient material such as rubber, thereby preventing the ingress of moisture into the vehicle. The seal also helps limit sound from outside the vehicle going into the vehicle.

For certain vehicles the movable side windows are not enclosed within a frame in a vehicle door. As a result, in order to open the driver door, for example, the driver's side window automatically moves downwards when the vehicle is unlocked and/or the driver's door is opened. This automatic downward movement of the driver's side window releases the upper edge region of the side window from sealing engagement with the suitable resilient means thereby allowing the driver's door to be opened. The passenger side behaves in the same way, and usually both the driver and passenger side windows automatically move downwards at the same time when the vehicle is unlocked.

For this type of vehicle, each time the driver door is opened, or the vehicle is unlocked, the side window moves downwards, and then upwards to re-form the seal with the suitable resilient means, as described above.

Due to this increased vertical upwards/downwards movement of the side window, for such vehicles there is an increased potential for the resilient means to become worn due to the need to unseal/seal the upper edge region of the movable side window with the resilient means.

The present inventors have found that this potential for damage may be further increased when the side window is a laminated side window, in particular a laminated side window comprising an inner pane of chemically strengthened glass.

The present invention aims to at least partially overcome the above mentioned problems.

Accordingly the present invention provides from a first aspect a laminated glazing comprising a first sheet of glass joined to a second sheet of glass by an interlayer structure therebetween, the interlayer structure comprising at least one sheet of adhesive interlayer material; the first sheet of glass having a first major surface and a second opposing major surface; the second sheet of glass having a first major surface and a second opposing major surface; the laminated glazing being configured such that the second major surface of the first sheet of glass faces the first major surface of the second sheet of glass; the first sheet of glass having a first edge surface between the first and second major surfaces of the first sheet of glass; the second sheet of glass having a first edge surface between the first and second major surfaces of the second sheet of glass; the first edge surface of the second sheet of glass intersecting the first major surface of the second glass sheet to define a first edge of the second sheet of glass; and the first edge surface of the second sheet of glass intersecting the second major surface of the second sheet of glass to define a second edge of the second sheet of glass; wherein the first edge surface of the second sheet of glass is configured to comprise at least one region between the first and second edges of the second sheet of glass such that in the at least one region the shortest distance along a straight line on the first edge surface of the second sheet of glass connecting a first point on the first edge of the second sheet of glass to a second point on the second edge of the second sheet of glass is at least 1.7 times the thickness of the second sheet of glass.

For the avoidance of doubt, and by way of example, for a second sheet of glass having a thickness of 1.0 mm, the first edge surface of the second sheet of glass is configured to comprise at least one region between the first and second edges of the second sheet of glass such that in the at least one region the shortest distance along a straight line on the first edge surface of the second sheet of glass connecting the first point on the first edge of the second sheet of glass to the second point on the second edge of the second sheet of glass is at least 1.7 mm, that is, (1.0×1.7) mm.

Preferably the first point on the first edge of the second sheet of glass and the second point on the second edge of the second sheet of glass lie on a line that is parallel to a normal on the first major surface of the second sheet of glass.

Preferably the first point on the first edge of the second sheet of glass lies on a normal to the first major surface of the second sheet of glass and the first point on the second edge of the second sheet of glass lies on a normal to the second major surface of the second sheet of glass.

In purely geometric terms the first edge and the second edge of the second glass sheet are lines defined by the intersection of the first and second major surfaces of the second glass sheet with the first edge surface of the second glass sheet. For example, if the second glass sheet was configured as a cube, the edges are the straight lines defined by the intersection of two adjacent faces of the cube. If the cube has rounded edges, the line defining the edge essentially has a width defined by a radius of curvature between the first edge surface and the first or second major surface. The rounded edge may be considered as part of the first edge surface.

It has been found by configuring the edge surface of the laminated glazing such that the first edge surface is defined as recited in claim 1, there is less potential for damage to a sealing engagement surface of the type used in a vehicle side window as described above.

Preferably the first edge surface of the second sheet of glass is a flat surface, or a substantially flat surface.

Preferably the first edge of the second sheet of glass is a rounded edge having a radius of curvature. Preferably the radius of curvature of the rounded first edge of the second sheet of glass is less than 0.5 mm, more preferably less than 0.4 mm, more preferably less than 0.3 mm, more preferably less than 0.2 mm, more preferably less than 0.1 mm. The radius of curvature of the rounded first edge of the second sheet of glass may be between 0.01 mm and 0.5 mm or between 0.05 mm and 0.5 mm.

Preferably the second edge of the second sheet of glass is a rounded edge having a radius of curvature. Preferably the radius of curvature of the rounded second edge of the second sheet of glass is less than 0.5 mm, more preferably less than 0.4 mm, more preferably less than 0.3 mm, more preferably less than 0.2 mm, more preferably less than 0.1 mm. The radius of curvature of the rounded second edge of the second sheet of glass may be between 0.01 mm and 0.5 mm or between 0.05 mm and 0.5 mm.

Preferably the first edge surface of the second sheet of glass comprises at least one flat portion and/or at least one concave portion and/or at least one convex portion.

Preferably the first edge surface of the second sheet of glass has a maximum between the first and second major surfaces of the second sheet of glass.

Preferably the second sheet of glass has a thickness that is less than a thickness of the first sheet of glass.

Preferably the first edge surface of the second sheet of glass is configured such that in the at least one region, the shortest distance along the line joining the first point on the first edge of the second sheet of glass to the second point on the second edge of the second sheet of glass is at least 1.8 times the thickness of the second sheet of glass, or 1.9 times the thickness of the second sheet of glass.

Preferably the first edge surface of the second sheet of glass is configured such that in the at least one region, the shortest distance along the line joining the first point on the first edge of the second sheet of glass to the second point on the second edge of the second sheet of glass is at least twice the thickness of the second sheet of glass.

Preferably the first edge surface of the second sheet of glass is configured such that in the at least one region, the shortest distance along the line joining the first point on the first edge of the second sheet of glass to the second point on the second edge of the second sheet of glass is at least 2.5 times the thickness of the second sheet of glass, or three times the thickness of the second sheet of glass.

Preferably the first edge surface of the second sheet of glass is configured such that in the at least one region, the shortest distance along the line joining the first point on the first edge of the second sheet of glass to the second point on the second edge of the second sheet of glass is at least 4 times the thickness of the second sheet of glass, or at least 5 times the thickness of the second sheet of glass, or at least 6 times the thickness of the second sheet of glass, or at least 7 times the thickness of the second sheet of glass, or at least 8 times the thickness of the second sheet of glass, or at least 9 times the thickness of the second sheet of glass.

Preferably the first edge surface of the second sheet of glass is configured such that in the at least one region, the shortest distance along the line joining the first point on the first edge of the second sheet of glass to the second point on the second edge of the second sheet of glass is at less than ten times the thickness of the second sheet of glass.

In some embodiments, the first point and the second point lie on a straight line, the straight line being at an angle relative to a normal on the first major surface of the second sheet of glass, the normal on the first major surface of the first sheet of glass pointing away from the first major surface of the second sheet of glass.

Preferably the straight line is at an angle of more than 45° to the normal on the first major surface of the second sheet of glass.

Preferably the angle is between 50° and 85°, preferably between 50° and 80°, more between 60° and 80°, even more preferably between 65° and 85°.

In some embodiments the first edge surface of the second sheet of glass comprises at least a first edge surface portion and at least a second edge surface portion, wherein the first edge surface portion of the first edge surface of the second sheet of glass is at an angle relative to the second edge surface portion of the first edge surface of the second sheet of glass.

Preferably the first edge surface portion of the first edge surface of the second sheet of glass is a flat surface or a curved surface.

Preferably the second edge surface portion of the first edge surface of the second sheet of glass is a flat surface or a curved surface.

Preferably first edge surface portion is inclined relative to the second edge surface portion at an angle of between 10° and 60°, preferably between 10° and 50°, more preferably between 10° and 40°, even more preferably between 20° and 40°.

Preferably the first edge surface portion of the first edge surface of the second sheet of glass or the second edge surface portion of the first edge surface of the second sheet of glass is substantially perpendicular to the first and/or second major surface of the second sheet of glass.

In some embodiments the first edge surface of the second sheet of glass is symmetrical about a plane of symmetry between the first and second major surfaces of the second sheet of glass.

Preferably the plane of symmetry is equidistant between the first and second major surfaces of the second sheet of glass and parallel thereto.

Preferably the first edge surface of the second sheet of glass has a first edge surface portion on one side between the first major surface of the second sheet of glass and the plane of symmetry, and a second edge surface portion on the opposite side between the plane of symmetry and the second major surface of the second sheet of glass.

Preferably the first edge surface portion of the first edge surface of the second sheet of glass comprises a flat surface or a curved surface.

Preferably the second edge surface portion of the first edge surface of the second sheet of glass comprises a flat surface or a curved surface.

In embodiments wherein the first edge surface of the second sheet of glass comprises at least a first edge surface portion and at least a second edge surface portion, preferably the first edge surface portion of the first edge surface of the second sheet of glass intersects the first major surface of the second sheet of glass to define the first edge of the second sheet of glass.

In embodiments wherein the first edge surface of the second sheet of glass comprises at least a first edge surface portion and at least a second edge surface portion, preferably the second edge surface portion of the first edge surface of the second sheet of glass intersects the second major surface of the second sheet of glass to define the second edge of the second sheet of glass.

In embodiments wherein the first edge surface of the second sheet of glass comprises at least a first edge surface portion and at least a second edge surface portion, preferably the first edge surface portion of the first edge surface of the second sheet of glass intersects the first major surface of the second sheet of glass to define the first edge of the first sheet of glass and the second edge surface portion of the first edge surface of the second sheet of glass intersects the second major surface of the second sheet of glass to define the second edge of the second sheet of glass.

In embodiments wherein the first edge surface of the second sheet of glass comprises at least a first edge surface portion and at least a second edge surface portion, preferably the first edge surface portion of the first edge surface of the second sheet of glass intersects the second edge surface portion of the first edge surface of the second sheet of glass to define a third edge of the second sheet of glass, the third edge of the second sheet of glass being between the first and second edges of the second sheet of glass.

Preferably the third edge of the second sheet of glass is a rounded edge having a radius of curvature. Preferably the radius of the curvature of the rounded third edge of the second sheet of glass is less than 0.5 mm, more preferably less than 0.4 mm, more preferably less than 0.3 mm, more preferably less than 0.2 mm, more preferably less than 0.1 mm. The radius of curvature of the rounded third edge of the second sheet of glass may be between 0.01 mm and 0.5 mm or between 0.05 mm and 0.5 mm.

In embodiments wherein the first edge surface of the second sheet of glass comprises at least a first edge surface portion and at least a second edge surface portion, preferably the first edge surface of the second sheet of glass further comprises a third edge surface portion between the first edge surface portion of the first edge surface of the second sheet of glass and the second edge surface portion of the first edge surface of the second sheet of glass.

Preferably the first edge surface portion of the first edge surface of the second sheet of glass intersects the third edge surface portion of the first edge surface of the second sheet of glass to define a third edge of the second sheet of glass, the third edge of the second sheet of glass being between the first and second edges of second sheet of glass. Preferably the third edge of the second sheet of glass is a rounded edge having a radius of curvature. Preferably the radius of the curvature of the rounded third edge of the second sheet of glass is less than 0.5 mm, more preferably less than 0.4 mm, more preferably less than 0.3 mm, more preferably less than 0.2 mm, more preferably less than 0.1 mm. The radius of curvature of the rounded third edge of the second sheet of glass may be between 0.01 mm and 0.5 mm or between 0.05 mm and 0.5 mm.

Preferably the third edge surface portion of the first edge surface of the second sheet of glass intersects the second edge surface portion of the first edge surface of the second sheet of glass to define a fourth edge of the second sheet of glass, the fourth edge of the second sheet of glass being between the first and second edges of the second sheet of glass and being between the second and third edges of the second sheet of glass. Preferably the fourth edge of the second sheet of glass is a rounded edge having a radius of curvature. Preferably the radius of the curvature of the rounded fourth edge of the second sheet of glass is less than 0.5 mm, more preferably less than 0.4 mm, more preferably less than 0.3 mm, more preferably less than 0.2 mm, more preferably less than 0.1 mm. The radius of curvature of the rounded fourth edge of the second sheet of glass may be between 0.01 mm and 0.5 mm or between 0.05 mm and 0.5 mm.

Preferably the third edge surface portion of the first edge surface of the second sheet of glass is inclined relative to the first and/or second edge surface portion of the first edge surface of the second sheet of glass.

Preferably the third edge surface portion of the first edge surface of the second sheet of glass comprises a flat surface or a curved surface.

Preferably the third edge surface portion of the first edge surface of the second sheet of glass is substantially perpendicular to the first and/or second major surface of the second sheet of glass.

In other embodiments the interlayer structure has a first edge surface, the first edge surface of the interlayer structure being at least partially aligned with the first edge of the second sheet of glass.

Preferably the first edge surface of the interlayer structure is at least partially aligned with the second edge of the second sheet of glass.

In embodiments wherein the second sheet of glass has a third edge, which may be a rounded third edge, the interlayer structure has a first edge surface, and preferably the first edge surface of the interlayer structure is at least partially aligned with the third edge of the second sheet of glass.

In embodiments wherein the second sheet of glass has a third edge and a fourth edge, either or both of which may be a rounded edge, the interlayer structure has a first edge surface and the first edge surface of the interlayer structure is at least partially aligned with the third and/or fourth edge of the second sheet of glass.

In other embodiments, preferably the first edge surface of the first sheet of glass is curved and has a maximum, further wherein the interlayer structure has a first edge surface, and the first edge surface of the interlayer structure is at least partially aligned with maximum of the first edge surface of the first sheet of glass or offset from the maximum of the first edge surface of the first sheet of glass.

In other embodiments, the laminated glazing has at least one edge surface and the first edge surface of the second sheet of glass and the first edge surface of the first sheet of glass are along the same edge surface of the laminated glazing.

In other embodiments, the laminated glazing is configured such that in use at least a portion of the first edge surface of the second sheet of glass forms part of an upper edge surface of the laminated glazing.

In other embodiments, the first edge surface of the second sheet of glass is spaced apart from the first edge surface of the first sheet of glass by the interlayer structure and is offset relative to an edge surface of the interlayer structure, wherein the first edge surface of the second sheet of glass, the first edge surface of the first sheet of glass and the edge surface of the interlayer structure form part of an edge surface of the laminated glazing.

Preferably the first edge surface of the first sheet of glass is offset relative to the edge surface of the interlayer structure.

Other embodiments have other preferable features.

Preferably, when viewed in a direction normal to a major surface of the laminated glazing, the first edge surface of the first sheet of glass and the first edge surface of the second sheet of glass are along the same side of the laminated glazing.

Preferably, when viewed in a direction normal to a major surface of the laminated glazing, the laminated glazing has an upper edge surface wherein the first edge surface of the first sheet of glass and the first edge surface of the second sheet of glass form part of the upper edge surface of the laminated glazing.

Preferably the laminated glazing is configured such that in use at least a portion of the first edge surface of the first sheet of glass is an upper edge of the laminated glazing.

Preferably the first sheet of glass is an outer sheet and the second sheet of glass in an inner sheet, the inner sheet being configured in use to face the interior of a vehicle in which the laminated glazing is installed.

Preferably first sheet of glass has a thickness between 1.3 mm and 6 mm.

Preferably the second sheet of glass has a thickness between 0.3 mm and 1.2 mm, more preferably a thickness between 0.4 mm and 1.0 mm.

Preferably the first and/or second sheet of glass is a sheet of glass formed by a float process.

Preferably the second sheet of glass is formed using a different process than the process used to form the first sheet of glass.

Preferably the first sheet of glass is a sheet of soda-lime-silicate glass.

Preferably the first sheet of glass has soda-lime-silicate glass composition comprising (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2%.

Preferably the first sheet of glass has a soda-lime-silicate glass composition comprising (by weight), $SiO_2$ 69-md 74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%.

Preferably the first sheet of glass is a sheet of thermally toughened glass or a sheet of thermally semi-toughened glass.

Preferably the first sheet of glass has a thickness between 1.3 mm and 1.49 mm and a surface compressive stress in at least a central region of the first major surface of the first sheet of glass sheet in the range of 18 MPa to 23 MPa.

Preferably the first sheet of glass has a thickness between 1.5 mm and 1.69 mm and a surface compressive stress in at least a central region of the first major surface of the first sheet of glass in the range of 23.1 MPa to 26 MPa.

Preferably the first sheet of glass has a thickness between 1.7 mm and 1.99 mm and a surface compressive stress in at least a central region of the first major surface of the first sheet of glass in the range of 26.1 MPa to 30 MPa.

Preferably the first sheet of glass has a thickness between 2.0 mm and 2.19 mm and a surface compressive stress in at least a central region of the first major surface of the first sheet of glass in the range of 30.1 MPa to 35 MPa.

Preferably the first sheet of glass has a thickness between 2.2 mm and 2.49 mm and a surface compressive stress in at least a central region of the first major surface of the first sheet of glass in the range of 35.1 MPa to 45 MPa.

Preferably the first sheet of glass has a thickness between 2.5 mm and 2.7 mm and a surface compressive stress in at least a central region of the first major surface of the first sheet of glass in the range of 45.1 MPa to 65 MPa.

Preferably the first sheet of glass has a thickness between 2.71 mm and 6 mm and a surface compressive stress in at least a central region of the first major surface of the first sheet of glass in the range of 65.1 MPa to 150 MPa, more preferably in the range of 65.1 MPa to 100 MPa.

Preferably the thickness of the second sheet of glass is less than 1.0 mm, preferably less than 0.8 mm. Preferably the thickness of the second sheet of glass is greater than 0.3 mm.

Preferably the thickness of the second sheet of glass is between 0.3 mm and 1.0 mm, more preferably the thickness of the second sheet of glass is between 0.3 mm and 0.8 mm.

Preferably the second sheet of glass has been chemically strengthened, for example preferably the second sheet of glass is a chemically strengthened sheet of glass.

Preferably the second sheet of glass is an alkali aluminosilicate glass composition.

Preferably the second sheet of glass includes at least about 6 wt % aluminium oxide ($Al_2O_3$).

Preferably the second sheet of glass has a composition comprising 66-72 mol. % $SiO_2$, 1-4 mol. % $Al_2O_3$, 8-15 mol. % MgO, 1-8 mol. % CaO, 12-16 mol. % $Na_2O$, preferably wherein MgO+CaO is between 12 and 17 mol. % and CaO/(MgO+CaO) is in the range 0.1 and 0.4.

Preferably the second sheet of glass has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Preferably the second sheet of glass is chemically strengthened to have a surface compressive stress greater than 400 MPa, preferably between 400 MPa and 900 MPa, more preferably between 400 MPa and 700 MPa, even more preferably between 450 MPa and 675 MPa.

Preferably the second sheet of glass is chemically strengthened to have a surface compressive stress of around 900 MPa Preferably the second sheet of glass is chemically strengthened to have a surface compressive stress of around 900 MPa or less.

Preferably the second sheet of glass is chemically strengthened to have a depth of layer (DOL) between 10 μm and 60 μm, more preferably between 25 μm and 45 μm, even more preferably between 30 μm and 40 μm.

Preferably the first sheet of adhesive interlayer material comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the first sheet of adhesive interlayer material has a thickness between 0.3 mm and 2.3 mm, more preferably between 0.3 mm and 1.6 mm, even more preferably between 0.3 mm and 0.9 mm.

In some embodiments the interlayer structure comprises a second sheet of adhesive interlayer material.

Preferably the second sheet of adhesive interlayer material comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the second sheet of adhesive interlayer material has a thickness between 0.3 mm and 2.3 mm, preferably between 0.3 mm and 1.6 mm, more preferably between 0.3 mm and 0.9 mm.

Preferably the interlayer structure comprises a support sheet in between the first sheet of adhesive interlayer material and the second sheet of adhesive interlayer material.

Preferably the support sheet has a thickness between 50 μm and 1000 μm.

Preferably the support sheet comprises a polyester.

Preferably the support sheet comprises polyethylene terephthalate (PET).

Preferably the support sheet comprises a sheet of glass.

Preferably the support sheet comprises an ionoplast interlayer material such as SentryGlas®.

Preferably the support sheet is monolithic. When the support sheet is monolithic the support sheet may also be referred to as a sheet of support material.

Preferably the support sheet is multi-layered. When the support sheet is multi-layered, the support sheet comprises at least two layers (a first layer and a second layer) that are the same material or are of different materials.

In some embodiments where the interlayer structure comprises a support sheet, the support sheet preferably comprises a first layer and a second layer, wherein the second layer is preferably a coating on the first layer.

In some embodiments where the interlayer structure comprises a support sheet and when the support sheet comprises a first layer and a second layer, the thickness of the first layer is the same as the thickness of the second layer.

In some embodiments where the interlayer structure comprises a support sheet and when the support sheet comprises a first layer and a second layer, the thickness of the first layer is different to the thickness of the second layer.

In some embodiments where the interlayer structure comprises a support sheet and when the support sheet is multi-layered, the support sheet may comprise three layers i.e. a first layer, a second layer and a third layer, wherein the second layer may sandwiched between the first and second layers such that the second layer of the support sheet is in direct contact on one side with the first layer of the support sheet and on the opposing side thereof with the third layer of the support sheet.

In some embodiments where the interlayer structure comprises a support sheet and when the support sheet is multi-layered having first, second and third layers, the first and third layers of the support sheet may comprise glass or a polyester, such as PET, and the second layer of the support sheet may comprise polyvinyl butyral or a copolymer of ethylene such as ethylene vinyl acetate.

Other embodiments have other preferable features.

Preferably the first and second sheets of glass each have a respective glass composition, the glass composition of the first sheet of glass being different to the glass composition of the second sheet of glass.

Preferably the first sheet of glass is a sheet of soda-lime silicate glass and the second sheet of glass comprises at least 6% by weight $Al_2O_3$.

Preferably the at least one region of the first edge surface of the second sheet of glass between the first and second edges of the second sheet of glass extends between the entirety of the first and second edges of the second sheet of glass.

Preferably the first and second edges of the second sheet of glass are parallel to each other.

Preferably the first edge of the second sheet of glass is straight.

Preferably the second edge of the second sheet of glass is straight.

The first and second sheets of glass each have a periphery. Preferably the periphery of the second sheet of glass is contiguous with the periphery of the first sheet of glass or the periphery of the second sheet of glass is enclosed within the periphery of the first sheet of glass.

When the periphery of the second sheet of glass is enclosed within the periphery of the first sheet of glass, a portion of the periphery of the first sheet of glass may be aligned with a portion of the periphery of the second sheet of glass.

In some embodiments the first sheet of glass is coextensive with the second sheet of glass.

In some embodiments the first and/or second sheet of glass comprises a respective first connection portion for connecting the laminated glazing to a mechanism for moving the laminated glazing, preferably in a vertical direction.

In use, the first connection portion of the first or second sheet of glass may be between a lower edge of the second sheet of glass and the mechanism.

Preferably the first connection portion is in mechanical communication with the respective sheet of glass but is not integrally formed therewith.

In some embodiments the first sheet of glass comprises a hole therein to define a first connection portion for connecting the laminated glazing to a mechanism for moving the laminated glazing, preferably in a vertical direction, further preferably wherein the first sheet of adhesive interlayer material has a hole therein and the hole in the first layer of interlayer material is concentric with the hole in the first sheet of glass.

In such embodiments the hole in the first sheet of glass and, when present, the hole in the first sheet of adhesive interlayer material are preferably the same shape, more preferably circular in shape.

In some embodiments there is a coating on the first major surface and/or the second major surface of the first and/or the second sheet of glass. In such embodiments the coating is preferably a solar control coating and/or a low emissivity coating and/or the coating preferably comprises at least one layer of silver.

From a second aspect the present invention provides a vehicle having an aperture for a window, in particular a side window, wherein a laminated glazing according to the first aspect of the present invention is movable within the aperture.

Suitably the laminated glazing has a first edge surface comprising at least a portion of the first edge surface of the first sheet of glass and the first edge surface of the laminated glazing is received in a seal when the movable window is closed.

In some embodiments of the second aspect of the present invention, the laminated glazing according to the first aspect of the present invention is configured such that the first and/or second sheet of glass comprises a respective first connection portion for connecting the laminated glazing to a mechanism for moving the laminated glazing, preferably in a vertical direction, and the laminated glazing is movable in the aperture in the vehicle by means of the mechanism connected to the first connection portion of the first or second sheet of glass.

Preferably the laminated glazing is vertically movable in the aperture.

Suitably the laminated glazing has a first edge surface comprising at least a portion of the first edge surface of the first sheet of glass and the first edge surface of the laminated glazing is received in a seal when the movable window is in a closed position.

Suitably the laminated glazing has a first edge surface comprising at least a portion of the first edge surface of the first sheet of glass and at least a portion of the first edge surface of the second sheet of glass, wherein the first edge surface of the laminated glazing is received in a seal when the movable window is closed.

From a third aspect the present invention provides a method of making a laminated glazing comprising the steps: (i) providing a first sheet of glass; (ii) edge working the first sheet of glass to provide the first sheet of glass with a first edge surface between a first and second major surface of the edge worked first sheet of glass; (iii) providing a second sheet of glass; (iv) edge working the second sheet of glass to provide the second sheet of glass with a first edge surface between a first and second major surface of the edge worked second sheet of glass, the first edge surface of the second sheet of glass intersecting the first major surface of the edge worked second sheet of glass to define a first edge of the edge worked second sheet of glass, and the first edge surface of the second sheet of glass intersecting the second major surface of the edge worked second sheet of glass to define a second edge of the edge worked second sheet of glass; (v) positioning an interlayer structure comprising at least one sheet of adhesive interlayer material between the edge worked first sheet of glass and the edge worked second sheet of glass, the first edge surface of the first sheet of glass and first edge surface of the second sheet of glass being arranged to be common with an edge surface of the laminated glazing; and (vi) using suitable lamination means to join the first sheet of edge worked glass to the second sheet of edge worked glass; wherein the first edge surface of the edge worked second sheet of glass is configured to comprise at least one region between the first and second edges of the edge worked second sheet of glass such that in the at least one region the shortest distance along a straight line on the first edge surface of the edge worked second sheet of glass connecting a first point on the first edge of the edge worked second sheet of glass to a second point on the second edge of the edge worked second sheet of glass is at least 1.7 times the thickness of the second sheet of glass.

As will be readily apparent, the first and second edges of the edge worked second sheet of glass are defined by the edge working step (iv) because this step provides the second sheet of glass with the first edge surface between the first and second major surfaces of the edge worked second sheet of glass. The first edge of the edge worked second sheet of glass may be defined by the start of the edge working on the first major surface of the second sheet of glass. Likewise, the second edge of the edge worked second sheet of glass may be defined by the start of the edge working on the second major surface of the second sheet of glass.

Preferably the first edge surface of the edge worked second sheet of glass surface is a flat surface, or a substantially flat surface.

Preferably the first edge surface of the edge worked second sheet of glass comprises at least one flat portion and/or at least one concave portion and/or at least one convex portion.

Preferably the first edge of the edge worked second sheet of glass is a rounded edge having a radius of curvature. Preferably the radius of curvature of the first rounded edge of the second sheet of glass is less than 0.5 mm, more preferably less than 0.4 mm, more preferably less than 0.3 mm, more preferably less than 0.2 mm, more preferably less than 0.1 mm. The radius of curvature of the first rounded edge of the second sheet of glass may be between 0.01 mm and 0.5 mm or between 0.05 mm and 0.5 mm.

Preferably the second edge of the edge worked second sheet of glass is a rounded edge having a radius of curvature. Preferably the radius of curvature of the second rounded edge of the second sheet of glass is less than 0.5 mm, more preferably less than 0.4 mm, more preferably less than 0.3 mm, more preferably less than 0.2 mm, more preferably less than 0.1 mm. The radius of curvature of the second rounded edge of the second sheet of glass may be between 0.01 mm and 0.5 mm or between 0.05 mm and 0.5 mm.

Preferably during step (ii) and/or step (iv), edge working is performed using a grinding tool, in particular a grinding wheel. Edge working may be performed using other abrasive means or using thermal processing using a flame or laser. When edge working is performed using a grinding tool, edge working may be referred to as grinding.

Preferably following step (ii), the edge worked first sheet of glass is bent in one or more direction using a shaping process, in particular a press bending process or a gravity bending process, the shaping process comprising heating the edge worked first sheet of glass to a temperature suitable for bending, then bending the heat softened first sheet of glass, then cooling the bent first sheet of glass for subsequent use in step (v).

Preferably following step (ii) the edge worked first sheet of glass is chemically strengthened or thermally strengthened.

Preferably following step (iv) the edge worked second sheet of glass is chemically strengthened or thermally strengthened.

Preferably prior to the step (v) the edge worked second sheet of glass is flat, preferably wherein the second sheet of glass has been chemically strengthened after step (iv).

Preferably the first edge surface of the second sheet of glass comprises at least a first edge surface portion, wherein following step (vi), the first edge surface portion is inclined towards the first edge surface of the first sheet of glass, more preferably the first edge surface portion is inclined towards the first and second major surface of the first sheet of glass.

Preferably during step (v), the first edge surface of the edge worked first sheet of glass is aligned with the first edge surface of the edge worked second sheet of glass.

Preferably the first sheet of glass is a sheet of soda-lime-silicate glass.

Preferably the first sheet of glass has a thickness between 1.3 mm and 6 mm.

Preferably the thickness of the second sheet of glass is greater than 0.3 mm and preferably wherein the thickness of the second sheet of glass is less than 1.2 mm, more preferably wherein the thickness of the second sheet of glass is between 0.3 mm and 1.0 mm.

Preferably the second sheet of glass is an alkali aluminosilicate glass composition and/or wherein the second sheet of glass comprises at least 6% by weight $Al_2O_3$.

Preferably following step (iv) the edge worked second sheet of glass is chemically strengthened to have a surface compressive stress greater than 400 MPa, preferably between 400 MPa and 900 MPa, more preferably between 400 MPa and 700 MPa, even more preferably between 450 MPa and 675 MPa.

Preferably following step (iv) the edge worked second sheet of glass is chemically strengthened to have a surface compressive stress of around 900 MPa.

Preferably following step (iv) the edge worked second sheet of glass is chemically strengthened to have a depth of layer (DOL) between 10 μm and 60 μm, more preferably between 25 μm and 45 μm, even more preferably between 30 μm and 40 μm.

Preferably the first sheet of adhesive interlayer material comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the first sheet of adhesive interlayer material has a thickness between 0.3 mm and 2.3 mm, more preferably between 0.3 mm and 1.6 mm, even more preferably between 0.3 mm and 0.9 mm.

Preferably the first edge surface of the edge worked second sheet of glass is configured such in the at least one region the shortest distance along a straight line on the first edge surface of the edge worked second sheet of glass connecting a first point on the first edge of the edge worked second sheet of glass to a second point on the second edge of the edge worked second sheet of glass is at least x times the thickness of the second sheet of glass, wherein x is 1.8, or 1.9, or 2.0, or 2.5, or 3, or 4, or 5, or 6, or 7, or 8, or 9.

Preferably in the at least one region the shortest distance along a straight line on the first edge surface of the edge worked second sheet of glass connecting the first point on the first edge of the edge worked second sheet of glass to a second point on the second edge of the edge worked second sheet of glass is less than 15 times the thickness of the second sheet of glass, preferably less than 10 times the thickness of the second sheet of glass.

Preferably the at least one region between the first and second edges of the edge worked second sheet of glass extends between the entire length of the first and second edges of the edge worked second sheet of glass.

Preferably the first and second edge of the edge worked second sheet of glass are parallel to each other, preferably wherein the first and second edge of the edge worked second sheet of glass are straight.

Preferably the first and/or second edges of the edge worked second sheet of glass are straight.

Preferably the first sheet of glass has soda-lime-silicate glass composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2%.

Preferably the first sheet of glass has a soda-lime-silicate glass composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%.

Preferably the second sheet of glass has a composition comprising 66-72 mol. % $SiO_2$, 1-4 mol. % $Al_2O_3$, 8-15 mol. % MgO, 1-8 mol. % CaO, 12-16 mol. % $Na_2O$, preferably wherein MgO+CaO is between 12 and 17 mol. % and CaO/(MgO+CaO) is in the range 0.1 and 0.4.

Preferably the second sheet of glass has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

The present invention will now be described with reference to the following figures (not to scale) in which:

FIG. 2b is a schematic cross-sectional representation of an upper portion of the glass sheet shown in FIG. 2a;

FIG. 2c is a schematic cross-sectional representation of an upper portion of another glass sheet shown similar to that shown in FIG. 2a;

FIG. 7a is schematic cross-sectional representation of a laminated glazing in accordance with the first aspect of the present invention;

FIG. 7b is an exploded schematic cross-sectional representation of the laminated glazing shown in FIG. 7a;

FIG. 7c is a schematic isometric representation of the upper portion of the laminated glazing shown in FIG. 7a;

FIG. 7d is a schematic cross-sectional representation of an upper portion of an inner sheet of glass used in the construction of the laminated glazing shown in FIG. 7a;

FIG. 8a is schematic cross-sectional representation of another laminated glazing in accordance with the first aspect of the present invention;

FIG. 8b is an exploded schematic cross-sectional representation of the laminated glazing shown in FIG. 8a;

FIG. 8c is a schematic isometric representation of the upper portion of the laminated glazing shown in FIG. 8a; and FIG. 8d is a schematic cross-sectional representation of an upper portion of an inner sheet of glass used in the construction of the laminated glazing shown in FIG. 8a.

It is known in the art that surface compressive stress measurements of non-chemically strengthened glass (i.e. thermally toughened or strengthened soda-lime-silicate glass) may be made using a Strainoptics Laser GASP-CS (http://www.strainoptics.com/files/Laser%20GASP-CS%20Quick-Start%20(English) pdf). Such equipment is available from Strainoptics, Inc., 108 W. Montgomery Avenue, North Wales, Pa. 19454 USA. For high levels of surface compressive stress, as typically found in chemically strengthened glass and fully thermally toughened soda-lime-silicate glass, it is known in the art that a differential stress refractometer (DSR) may be used to measure surface compressive stress. Such equipment is available from Gaertner Scientific Corporation, 3650 Jarvis Avenue, Skokie, Ill. 60076 USA.

It is also known in that art that glass sheets used to form laminated glazings have edge surfaces substantially orthogonal to the major surfaces of the respective glass sheet. As glass sheets are cut from larger sheets, the edge surfaces may comprise micrometre scale flaws such as sub-surface micro cracks. If the glass sheet is subjected to a stress, the cracks may propagate causing the glass sheet to break. In addition, the edges form sharp corners that can easily chip and form surface contaminating glass chips. To reduce breakage and/or to reduce chipping, the edge surfaces are typically edge worked (often referred to as "finished") using an edge working (or edge finishing) process to obtain a desired contour and smoothness. In addition, the edge working (or edge finishing) process can remove flaws from the edge surface and contour the corners. Edge working (or edge finishing) includes grinding and polishing. Typically, in the art glass sheets are provided with edge surfaces having a convex curvature often referred to as a C-profile.

Figure 1:
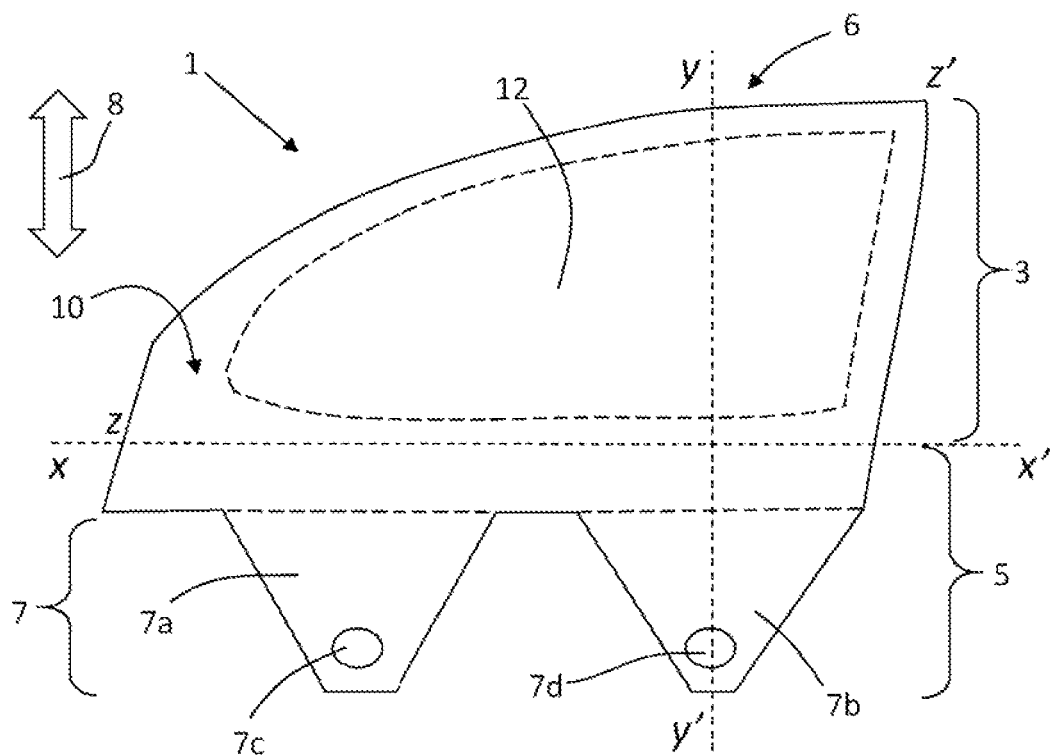
FIG. 1 is a schematic plan view of a vehicle side window.

FIG. 1 shows a plan view of a typical vehicle side window 1. In plan view, the vehicle side window 1 has an upper region 3, a lower region 5 and a connection region 7.

The upper region 3 is defined in relation to a line x-x', and the line x-x' is defined by the styling of the vehicle into which the vehicle side window is installed, as will be discussed in more detail below. In this example the connection region 7 comprises a first trapezoidal portion 7a and a second trapezoidal portion 7b. Each trapezoidal portion 7a, 7b has a respective hole 7c, 7d therein at the narrow end thereof. The holes 7c, 7d are used to connect a winder mechanism (not shown) to the vehicle side window 1 to move the vehicle side window vertically, i.e. in the direction of arrow 8.

The vehicle side window 1 has a major surface 10 configured for use as an outer surface. The major surface 10 has a central region 12, the central region being inboard of the periphery of the vehicle side window 1.

The vehicle side window 1 has an upper edge region 6 extending between the points z and z' on the periphery of the vehicle side window 1 and lying on line x-x'.

Figure 2:
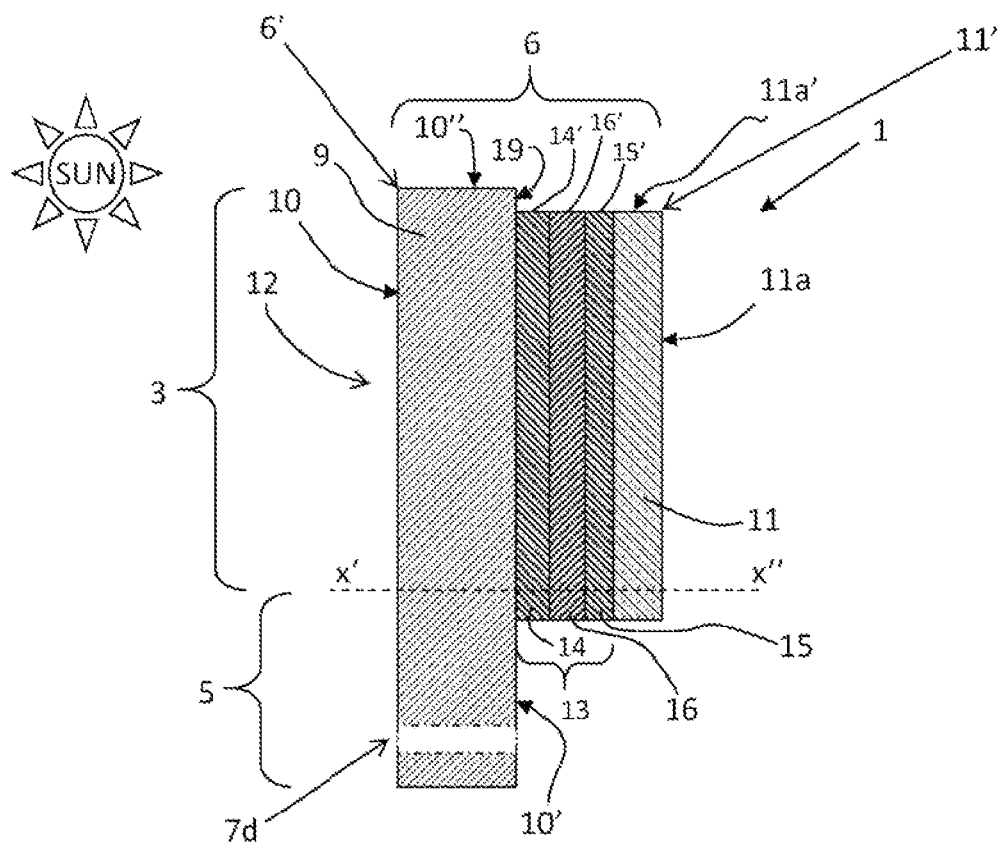
FIG. 2 is a schematic cross-sectional representation of the vehicle side window shown in FIG. 1 along the line y-y'.

FIG. 2 shows a schematic cross-sectional view of the vehicle side window 1 shown in FIG. 1 taken through the line y-y'. The line x'-x" forms a horizontal plane with the line x-x'.

The vehicle side window 1 comprises a first sheet of glass 9 joined to a second sheet of glass 11 by an interlayer structure 13 consisting of a first sheet of polyvinyl butyral (PVB) 14, a second sheet of PVB 15 and a support sheet 16 therebetween. In this example the support sheet is a 250 μm thick sheet of polyethylene terephthalate (PET), although the thickness of the support sheet may be thicker or thinner. If the support sheet is more rigid, the thickness thereof may be reduced.

The first sheet of PVB 14 has a thickness of 0.38 mm and the second sheet of PVB 15 has a thickness of 0.38 mm. Each of the first and second sheets of PVB may have a different thickness, for example 0.76 mm or 0.82 mm or 0.86 mm. The first and/or second sheet of PVB may be acoustic modified PVB having a thickness of about 0.5 mm.

The sheet of PET 16 is between the first and second layers of PVB 14, 15. The sheet of PET 16 has a first major surface and a second opposing major surface. One major surface of the sheet of PET 16 is in direct contact with the first sheet of PVB 14 and the other major surface of sheet of PET 16 is in direct contact with the second sheet of PVB 15.

The first sheet of glass 9 has a second major surface 10' opposite the first major surface 10 thereof. The first sheet of PVB 14 is in direct contact with the second major surface 10'.

The second sheet of glass 11 has a first major surface (not labelled in FIG. 2) and a second opposing major surface 11a. The second sheet of PVB 15 is in direct contact with the first major surface of the second sheet of glass 11.

The second major surface 10' of the first sheet of glass 9 may have a coating thereon, in which case the second major surface 10' of the first sheet of glass would be a coated glass surface. In such an embodiment, the first layer of PVB 14 would be in contact with the coating on the second major surface 10' of the first sheet of glass 9.

Similarly, the first major surface of the second sheet of glass 11 may have a coating thereon, in which case the first major surface of the second sheet of glass is a coated glass surface. In such an embodiment, the second layer of PVB 15 would be in contact with the coating on the first major surface of the second sheet of glass 11.

It is also possible that the outer facing surfaces 10, 11a of the laminated glazing (vehicle side window 1) may have a coating thereon.

Using conventional nomenclature, the major surface 10 of the vehicle side window 1 is known as "surface 1" because it is the first surface of the glazing facing the "outside", i.e. in normal use, the first major surface 10 of the vehicle side window 1 is the surface a ray of sunlight strikes first.

The first sheet of glass 9 is a sheet of soda-lime-silicate glass having a composition such as clear float glass, typically with the addition of iron oxide as a tinting agent to provide the laminated glazing with some form of solar control and/or a desired colour in transmission.

A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; SO3 0-2%; $Fe_2O_3$ 0.005-2%. The glass composition may also contain other additives, for example, refining aids, which would normally be present in an amount of up to 2%. The soda-lime-silicate glass composition may contain other colouring agents such as $Co_3O_4$, NiO and Se to impart to the glass a desired colour when viewed in transmitted light. The transmitted glass colour may be measured in terms of a recognised standard such as BS EN410.

In this example the first sheet of glass 9 has a thickness of 2.1 mm and has been thermally semi-toughened using a conventional high pressure cooling air technique such that the compressive stress in at least the central region 12 of the first major surface of the first sheet of glass is around 33 MPa.

The second sheet of glass 11 has a thickness of 0.7 mm but may have a thickness in the range of 0.3 mm to 0.8 mm, for example 0.4 mm to 0.8 mm. The second sheet of glass 11 may have a thickness of 0.5 mm.

The second sheet of glass has been chemically strengthened using a conventional molten salt ion exchange process to exchange sodium ions in the surface of the second sheet of glass with potassium ions from a suitable molten salt. The chemical strengthening process is controlled to provide the second sheet of glass with a depth of layer (DOL) of 35 μm and a surface compressive stress greater than 400 MPa, typically between 450 MPa and 700 MPa. The surface compressive stress may be as high as 900 MPa. The DOL may be between 30 μm and 40 μm.

A suitable glass composition for the second sheet of glass 11 is an alkali aluminosilicate glass such as Gorilla™ glass available from Corning Incorporated.

A specific composition for the second sheet of glass 11 is 68 mol % $SiO_2$, 2.5 mol % $Al_2O_3$, 11 mol % MgO, 3.7 mol % CaO, 14.2 mol % $Na_2O$, 0.6 mol % $K_2O$. For this composition MgO+CaO is 14.7 mol % and $Na_2O+K_2O$ is 14.8 mol %. This is composition number 13 in table 2 on page 20 of WO2014/148020A1 as published. The iron oxide ($Fe_2O_3$) content of the second ply may be low, being less than 0.1 percent by weight i.e. about 0.012 percent by weight.

As shown in FIG. 2, the hole 7d passes through the first sheet of glass 9 and extends between the first and second major surface 10, 10' thereof. The hole 7c also passes through the first sheet of glass 9. The holes 7c, 7d help define the position of the connection region 7

As FIG. 2 shows, the interlayer structure 13 and the second sheet of glass 11 extend below the line x'-x", and consequently below the line x-x' in FIG. 1. The first and second layers of PVB 14, 15, the sheet of PET 16 and the second sheet of glass 11 are not coextensive with the first sheet of glass 9. This results in the connection region 7 not being covered by the first and second layers of PVB 14, 15, the sheet of PET 16 and the second sheet of glass 11 so that a conventional winder mechanism (not shown) may be attached to the connection region 7 i.e. via holes 7c (not shown in FIG. 2) and 7d.

The interlayer structure 13, prior to lamination, may be formed from three separate sheets i.e. a sheet of PVB 14, a sheet of PET 16 and a sheet of PVB 15. Alternatively the interlayer structure may be at least partly preformed prior to lamination, for example the first and/or second sheet of PVB 14, 15 may be joined to the sheet of PET 16 prior to the lamination process to join the first sheet of glass 9 to the second sheet of glass 11 by means of the interlayer structure 13. For example the first sheet of PVB 14 may be joined to the sheet of PET 16 prior to lamination. Such a composite structure is available commercially for spall protection, for example Spallshield® available from Kurary (www.trosifol.com). Typically in such a composite structure product, the surface of the PET not in contact with PVB is usually coated with an abrasion resistant hard coat.

Conventional lamination processed may be used to join the first sheet of glass 9 to the second sheet of glass 11 by means of the interlayer structure 13.

Although the first and second sheets of glass 9, 11 are shown as flat (or planar), it is possible for the laminated glazing 1 to be curved in at least one direction. In such embodiments the first sheet of glass 9 may be suitably curved prior to lamination whilst the second sheet of glass 11 is flat prior to lamination. Due to the relative flexibility of the second sheet of glass 11, during lamination the second sheet of glass 11 may be held against the interlayer structure 13 to conform to the shape of the curved first sheet of glass 9. Such a process is often referred to as "cold forming" in the art.

The first sheet of glass 9 has an upper edge surface 10" that is substantially perpendicular to the first and second major surfaces 10, 10'. The intersection of the upper edge surface 10" with the first major surface 10 defines an edge 6' of the upper edge region 6. Opposite edge 6' is another edge (not labelled) defined by the intersection of upper edge surface 10" with the second major surface 10' of the first sheet of glass. In this example the edge surface 10" is flat but typically the edge surface 10" is curved by edge working having what is known in the art as a "C" grind or a C-profile.

The second sheet of glass 11 has an upper edge surface 11a' that is flat and a first edge 11' defined by the intersection of the second major surface 11a with the upper edge surface 11a'. Opposite edge 11' the second sheet of glass 11 has a second edge (not labelled) defined by the intersection of the edge surface 11a' with the first major surface opposite major surface 11a. Again, the upper edge surface 11a' may have a C-profile.

The upper region of the sheet of PVB 14 has an upper edge surface 14'. The upper region of the sheet of PVB 15 has an upper edge surface 15'. The upper region of the sheet of PET 16 has an upper edge surface 16'. The upper edge regions 14', 15' and 16' define an upper edge surface of the interlayer structure 13.

In this example the upper edge region 6 of the vehicle side window 1 can be seen to consist of the upper edge surface 10" of the first sheet of glass 10, the upper edge surface 14' of the first sheet of PVB 14, the upper edge surface 16' of the sheet of PET 16, the upper edge surface 15' of the second sheet of PVB 15 and the upper edge surface 11a' of the second sheet of glass 11.

In this example the upper edge surfaces 14', 15', 16' and 11a' are all aligned, but they may not be.

The aligned upper edge surfaces 14', 15', 16' and 11a' are spaced apart from the upper edge surface 10" of the first sheet of glass 10 by a distance 19, which may be less than 5 mm, for example 0.5 mm-2 mm. This type of arrangement is typical for a movable vehicle side window.

Figure 2A:
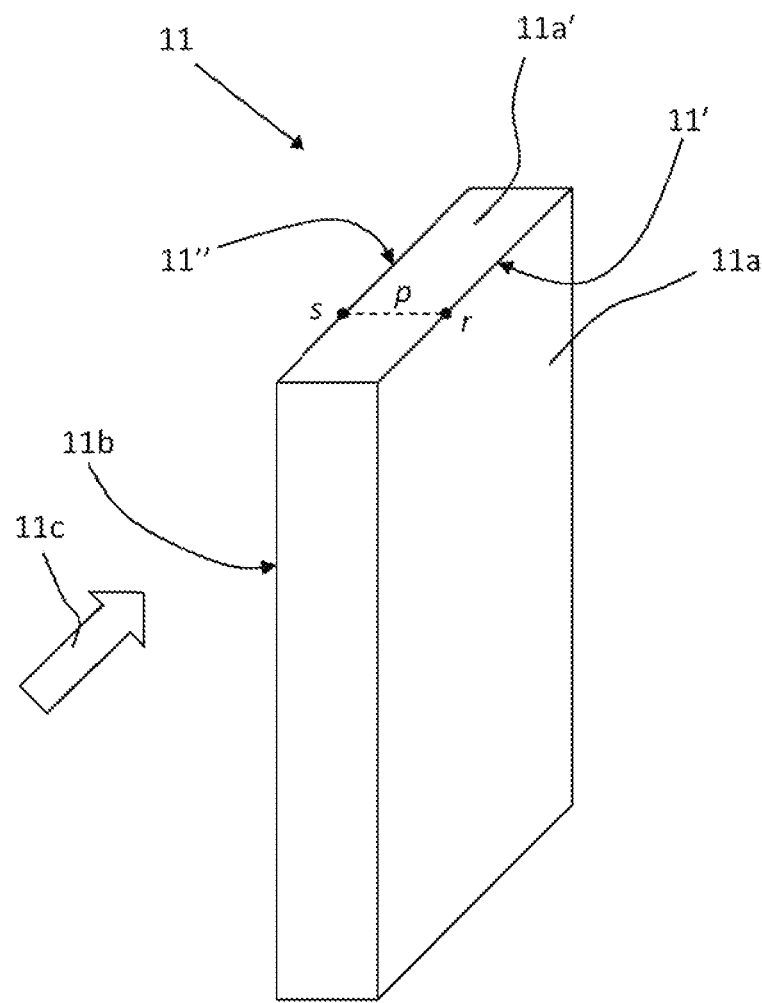
FIG. 2a is a schematic isometric representation of a sheet of glass.

FIG. 2a shows a schematic isometric representation of the second sheet of glass 11. The second sheet of glass 11 may be thought of as a rectangular block having a first major surface 11b and a second opposing major surface 11a. The first and second major surfaces 11b, 11a are flat and parallel to each other. At an upper end, the second sheet of glass 11 has an upper edge surface 11a' that is a flat surface and is perpendicular to the first and second major surfaces 11b, 11a.

The intersection of the upper edge surface 11a' with the second major surface 11a defines a first edge 11'. The intersection of the upper edge surface 11a' with the second major surface 11b defines a second edge 11". The first and second edges 11', 11" are straight lines.

A first point r is shown that lies on the first edge 11' (and consequently the first point r lies on the second major surface 11a). A second point s is shown that lies on the second edge 11" (and consequently the second point s lies on the first major surface 11b).

A line p is shown connecting the first point r to the second point s. The line p lies on the upper edge surface 11a'.

Due to the particular configuration of the second sheet of glass 11, it will be readily apparent that the shortest length for the line p is when the first point r and the second point s lie on a straight line that is perpendicular to the first and second edges 11', 11". In this example the length of the line p is equal to the thickness of the second sheet of glass 11, so this is not a sheet of glass for use in an embodiment of the first aspect of the present invention.

Figure 2B:
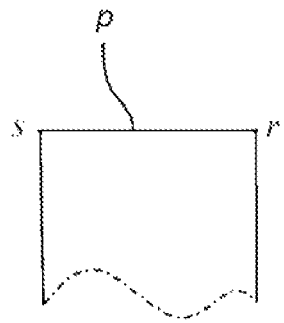

When viewed in the direction of arrow 11c, said arrow being parallel to the upper edge surface 11a', the upper cross-sectional view of the second sheet of glass 11 is shown in FIG. 2b i.e. a cross-section through a plane through the line r-s.

Figure 3:
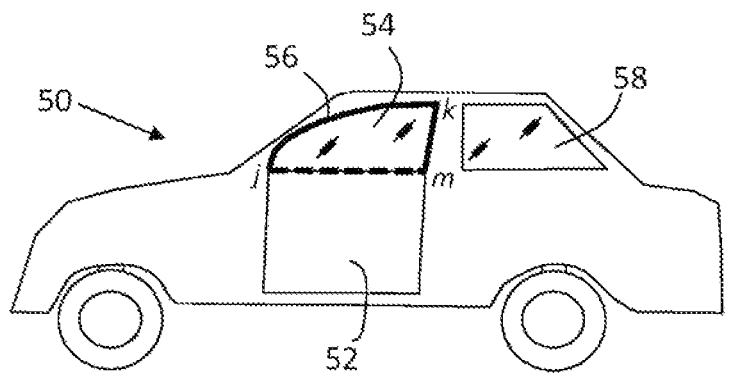
FIGS. 3-6 are schematic side views of a vehicle having a vehicle side window.

FIG. 3 shows a schematic side view of a vehicle 50 (i.e. a car). The vehicle 50 has a side door 52 and an aperture 54 having a periphery 56 in which a vehicle side window of the type shown in FIGS. 1 and 2 is vertically movable therein in a manner known in the art. The periphery 56 may be defined by part of the vehicle door i.e. a suitable frame, or a part of the vehicle body.

The periphery 56 has corners j, k and m. The line j-m defines the position of the line x-x' shown in FIG. 1. In FIG. 3 the aperture 54 is shown in a closed configuration with the vehicle side window closing the aperture 54. With reference to FIGS. 1 and 2, a portion of the major surface 10 of the first sheet of glass closes the aperture 54.

Also shown in FIG. 3, the vehicle 50 has a fixed side window 58 that may have a configuration in accordance with the present invention. However as the side window 58 is fixed in a frame, there is no need for the side window 58 to have a connection region for connecting a winder mechanism to the side window 58.

Figure 4:
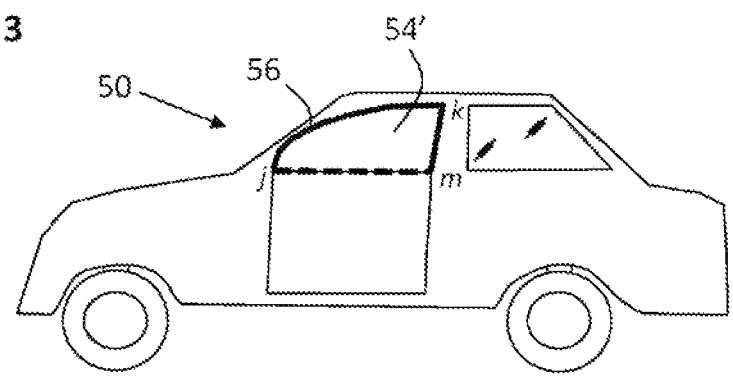

FIG. 4 shows the vehicle 50 with the aperture in a second configuration 54' with the vehicle side window wound fully down.

With reference to FIGS. 1, 2 and 3, FIG. 5 shows vehicle 50 having a side door 52 incorporating a vehicle side window 1 movable in aperture 54. In this figure, the vehicle side window 1 below the line x-x' (i.e. the line j-m defined by the aperture) is shown in phantom. Located in a lower portion of the door 52 is a winder mechanism 60. A suitable linkage 62 connects the winder mechanism 60 to the connection region of the vehicle side window 1. A first linkage member 63 is in mechanical communication with the first trapezoidal portion 7a and a second linkage member 64 is in mechanical communication with the second trapezoidal portion 7b. The holes 7c, 7d may be used to attach an end of the respective linkage member 63, 64 to the respective trapezoidal portion 7a, 7b.

The aperture 54 is closed by the upper region 3 of the vehicle side window 1 and the upper edge region 6 may engage with a suitable resilient means as previously discussed.

Figure 5:
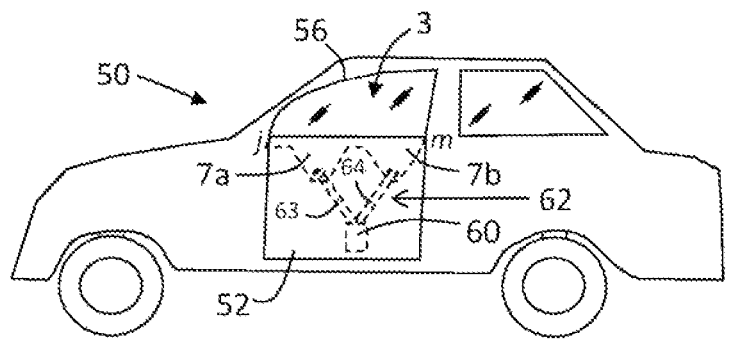
Figure 6:
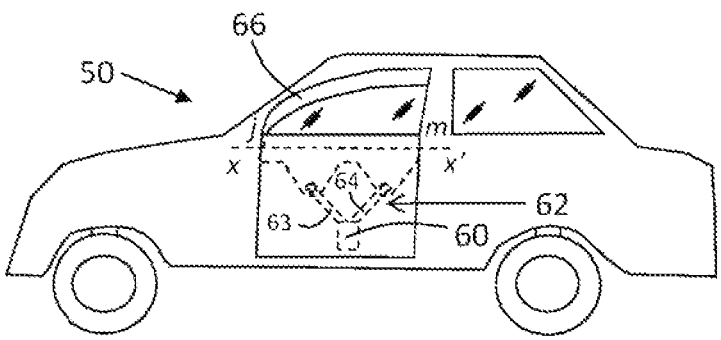

FIG. 6 shows the vehicle 50 shown in FIG. 5 where the winder mechanism 60 has been suitable actuated to wind the vehicle side window partially down such that there is an opening 66 in the aperture 54 i.e. the aperture is no longer fully closed. By actuation of the winder mechanism 60 the winder linkage 62 moves from the first position shown in FIG. 5 to the second position shown in FIG. 6. Each of the first and second linkages 63, 64 are suitably moved towards the winder mechanism 60 thereby lowering the vehicle side window in the aperture. Consequently the line x-x' on the vehicle side window 1 moves below the line j-m defined by the aperture 54. The interior of the vehicle 50 is accessible via the opening 66.

FIG. 7a shows a schematic cross-sectional representation of a laminated glazing according to the first aspect of the present invention. FIG. 7b is an exploded view of the laminated glazing 100 to aid with the description thereof.

The laminated glazing 100 comprises a first sheet of glass 102 joined to a second sheet of glass 104 by means of an interlayer structure 106. The first sheet of glass 102 is thicker than the second sheet of glass and has a thickness of about 2.1 mm. The second sheet of glass 104 has a thickness of about 0.5 mm.

The first sheet of glass 102 has a first major surface 116 and an opposing second major surface 118. The first sheet of glass 102 also has an upper edge surface 114 joining the first and second major surfaces 116, 118 thereof. The upper edge surface 114 is a ground edge having a C-shaped profile, as is conventional in the art.

The second sheet of glass 104 has a first major surface 120 and an opposing second major surface 122. The second sheet of glass 104 also has an upper edge surface 124 joining the first and second major surfaces 120, 122 thereof. In this example the upper edge surface 124 of the second sheet of glass 104 is flat and intersects the second major surface 122 to define a first edge 126 of the second sheet of glass 104. The upper edge surface 124 also intersects the first major surface 120 to define a second edge 128 of the second sheet of glass 104.

The upper edge surface 124 of the second sheet of glass 104 was formed using a suitably configured abrasive grinding tool, such as a grinding wheel. Initially the upper edge surface of the second sheet of glass was perpendicular to the first and second major surfaces 120, 122 of the second sheet of glass. By using an edge working step the upper edge 124 was formed.

The first sheet of glass 102 is a sheet of soda-lime-silicate glass having a composition such as clear float glass, typically with the addition of iron oxide as a tinting agent to provide the laminated glazing with some form of solar control.

After the second sheet of glass 104 has been provided with the upper edge surface 124 by an edge working step, the second sheet of glass 104 was chemically strengthened using a conventional molten salt ion exchange process to exchange sodium ions in the surface of the second sheet of glass with potassium ions from a suitable molten salt. The chemical strengthening process was controlled to provide the second sheet of glass with a depth of layer (DOL) of 35 μm and a surface compressive stress greater than 400 MPa, typically between 450 MPa and 700 MPa. The surface compressive stress may be as high as 900 MPa. The DOL may be between 30 μm and 40 μm.

A specific composition for the second sheet of glass 104 is 68 mol % $SiO_2$, 2.5 mol % $Al_2O_3$, 11 mol % MgO, 3.7 mol % CaO, 14.2 mol % $Na_2O$, 0.6 mol % $K_2O$. For this composition MgO+CaO is 14.7 mol % and $Na_2O+K_2O$ is 14.8 mol %. This is composition number 13 in table 2 on page 20 of WO2014/148020A1 as published. The iron oxide ($Fe_2O_3$) content of the second ply may be low, being less than 0.1 percent by weight i.e. about 0.012 percent by weight.

The edge surface 114 is formed prior to the first glass sheet 102 being thermally toughened. The edge surface 124 is formed prior to the second glass sheet 102 being chemically strengthened.

The interlayer structure 106 comprises a first sheet of PVB 108 having a thickness of 0.38 mm, a sheet of PET 112 having a thickness of 0.05 mm and a second sheet of PVB 110 having a thickness of 0.38 mm. The first and second sheets of PVB 108, 110 are each joined to the opposing major surfaces of the sheet of PET 112. The first sheet of PVB 108 is joined to the first sheet of glass 102 by adhesive contact with the second major surface 118 of the first sheet of glass 102. The second sheet of PVB 110 is joined to the second sheet of glass 104 by adhesive contact with the first major surface 120 of the second sheet of glass 104.

The interlayer structure 106 may be replaced by a single sheet of PVB, or there may not be a sheet of PET 112 between the first and second sheets of PVB 108, 110. There may be more than two sheets of PVB or other suitable interlayer material such as EVA.

Figures 7C, 7D:
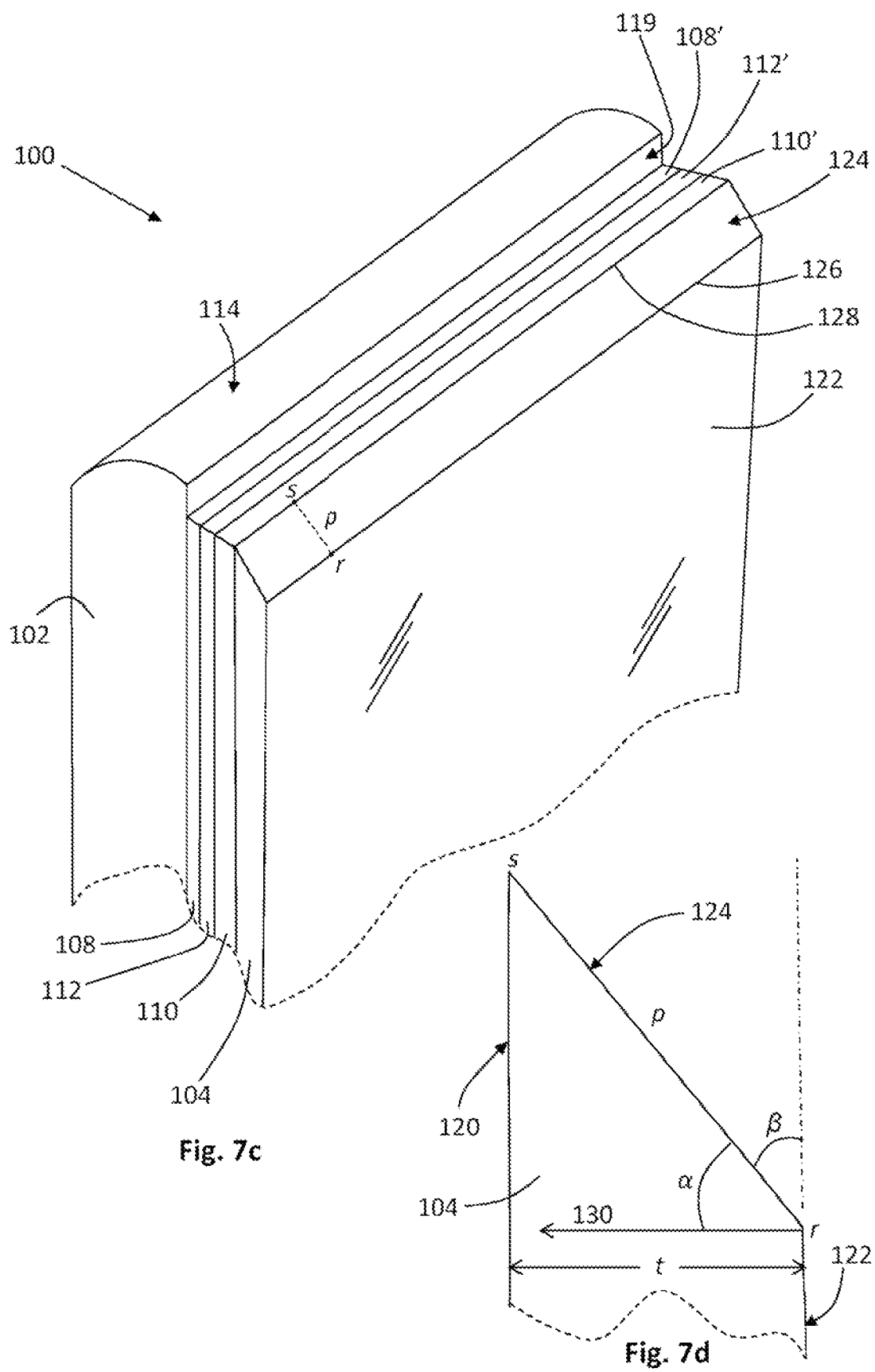

FIG. 7c shows a schematic isometric representation of the upper portion of the laminated glazing 100 shown in FIG. 7a. With reference to FIGS. 7a-7c, in this example of the present invention, the upper edge surface 124 is upwardly inclined relative to the second major surface 122. Furthermore, the shortest distance between the first and second edges 126, 128 of the second sheet of glass 104 is three times the thickness of the second sheet of glass 104. That is, for a first point r lying on the first edge 126 and a second point s lying on the second edge 128, the shortest length of line p on the edge surface 124 is three times the thickness of the second sheet of glass 104.

As can be seen from FIGS. 7a-7c, the first and second sheets of PVB 108, 110, the sheet of PET 112 and the second sheet of glass 104 are arranged relative to the first sheet of glass 102 such that there is an offset 119 between the upper edge surface 114 of the first sheet of glass and the upper edge surface 108' of the first sheet of PVB 108, the upper edge surface 110' of the second sheet of PVB 110, the upper edge surface 112' of the sheet of PET 112 and the upper edge surface 124 of the second sheet of glass 104.

The laminated glazing 100 may be a vehicle side window configured in a similar way as shown in relation to FIGS. 1, 2 and 3-6.

FIG. 7d shows a schematic cross-section representation of an upper portion of the second sheet of glass 104. The edge surface 124 is inclined at an angle α relative to a normal 130 on the second major surface 122. The first and second major surfaces 120, 122 are flat and substantially parallel to one another. The thickness of the second sheet of glass is t i.e. the spacing of the first and second major surfaces 120, 122. Given that the distance p in this example is 3t, the angle α is $$\cos^{-1}\left(\frac{t}{3t}\right).$$

Hence, α is about 70.5°. It is preferred that the angle α be between 60° and 80°, more preferably between 65° and 75°. The angle β is 90°-70.5°=19.5°.

A second laminated glazing in accordance with the first aspect of the present invention is shown with reference to FIGS. 8a-8d.

FIG. 8a shows a schematic cross-sectional view of another laminated glazing in accordance with the present invention. FIG. 8a shows a laminated glazing 200 that is similar to the laminated glazing 100 shown in FIG. 7a. The laminated glazing 200 comprises a first sheet of soda-lime-silicate glass 202 joined to a second sheet of glass 204. The first sheet of glass 202 has a thickness of 2.1 mm and has been thermally semi-toughened but may be thermally toughened. The second sheet of glass 204 has a thickness of 0.55 mm and has been chemically strengthened.

The first sheet of glass 202 is joined to the second sheet of glass 204 by means of an interlayer structure consisting of a first sheet of PVB 208, a second sheet of PVB 210 with a sheet of PET 212 therebetween. The first and second sheets of PVB each have a thickness of 0.38 mm and the sheet of PET 112 has a thickness of about 0.05 mm.

In contrast to the laminated glazing 100, the second sheet of glass 204 of the laminated glazing 200 has an upper edge surface that comprises three substantially flat (or planar) portions. This is better illustrated in FIG. 8b where the second sheet of glass 204 is shown displaced from the laminated glazing 200 to aid with the description thereof.

The second sheet of glass 204 has a first major surface 220 and a second opposing major surface 222. The first and second major surfaces 220, 222 are both substantially flat. The first major surface 220 is substantially parallel to the second major surface 222. The second sheet of glass 204 also has an upper edge surface 224 joining the first and second major surfaces 220, 222. The upper edge surface 224 has a first edge surface portion 224a, a second edge surface portion 224b and a third edge surface portion 224c. The upper edge surface 224 may be produced by using a suitably configured grinding wheel. The grinding wheel in this example was configured to produce a symmetrical grind about an axis parallel to the midpoint between the first and second major surfaces of the second glass sheet 204. This axis is shown as line w-w' in FIG. 8d and is parallel to the first and second major surfaces 220, 222. In this example the first, second and third edge surface portions 224a, 224b and 224c are flat.

With reference to FIGS. 8a-8d, the first edge surface portion 224a of the upper edge surface 224 of the second sheet of glass 204 intersects the second major surface 222 of the second glass sheet 204 to define a first edge 226. The third edge surface portion 224c of the upper edge surface 224 of the second sheet of glass 204 intersects the first major surface 220 of the second glass sheet 204 to define a second edge 228. The second edge surface portion 224b is flat and perpendicular to the first and second major surfaces 220, 222. The second edge surface portion 224b intersects the first edge surface portion 224a to define a third edge 232 of the second sheet of glass 204. The second edge surface portion 224b also intersects the third edge surface portion 224c to define a fourth edge 234 of the second sheet of glass 204.

Figures 8C, 8D:
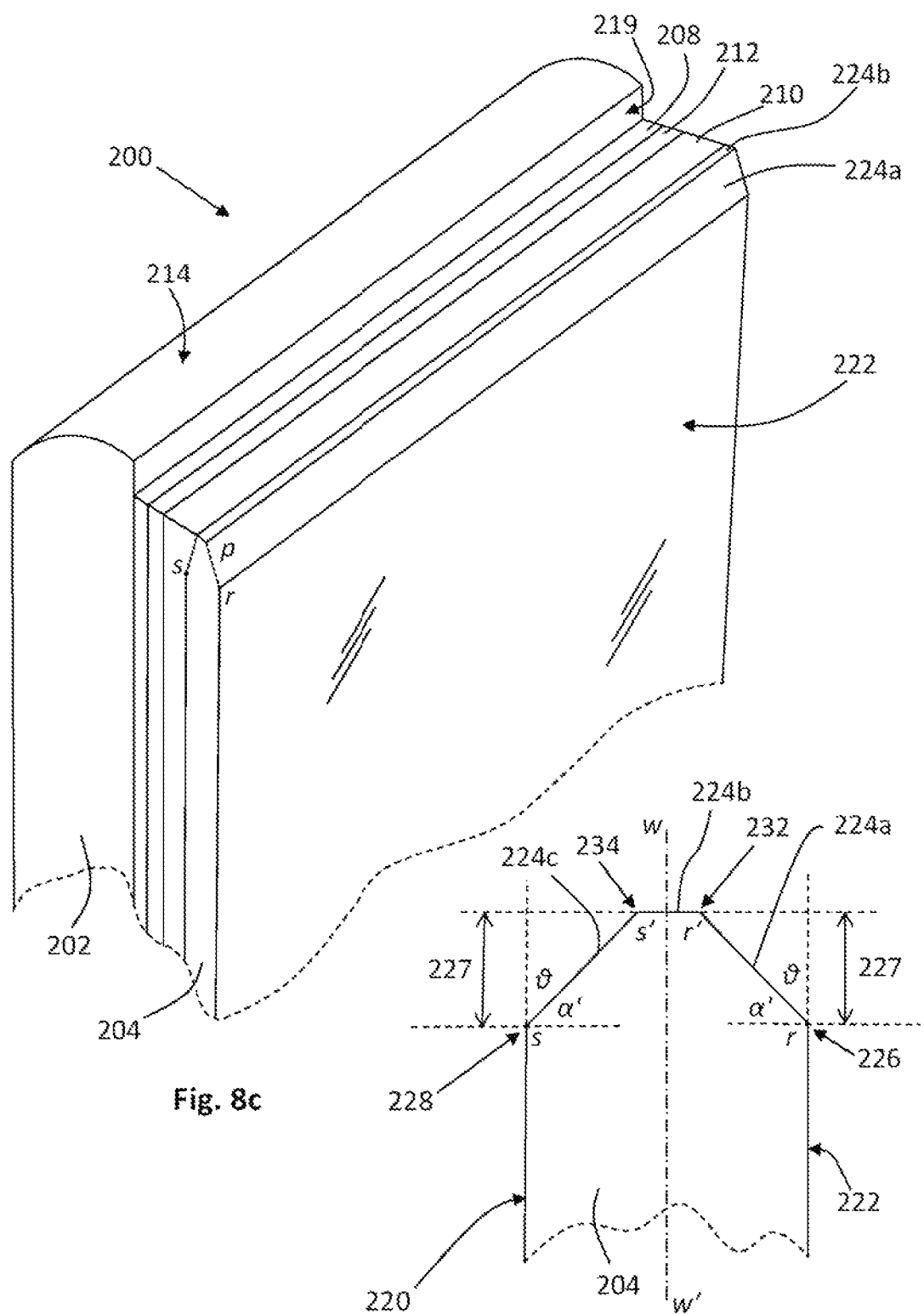

As can be seen from FIGS. 8a-8c, the first and second sheets of PVB 208, 210, the sheet of PET 212 and the second sheet of glass 204 are arranged relative to the first sheet of glass 202 such that there is an offset 219 between the upper edge surface 214 of the first sheet of glass and the upper edge surface of the second sheet of glass 204.

With further reference to FIG. 8d, for such a second sheet of glass 204 having a thickness of 0.55 mm the grind depth 227 was about 0.7 mm. The first edge surface portion 224a is inclined relative to the second major surface 222 at an angle θ of about 17°. The first edge surface portion 224a is therefore inclined at an angle α' relative to a normal on the second major surface 222 of about 73° (=90-17°). The third edge surface portion 224c is also inclined at an angle θ of about 17° to the first major surface 220. The third edge surface portion 224c is therefore also inclined at an angle α' relative to a normal on the first major surface 220 of about 73° (=90°-17°). It is preferred that the angle α' be between 60° and 80°, preferably between 65° and 80°, more preferably between 65° and 78°.

The grind depth 227 is produced by an edge working process using a grinding wheel as described above.

A point r is shown on the first edge 226. A point r' is shown on the third edge 232. A point s' is shown on the fourth edge 234. A point s is shown on the second edge 228.

In this example, given that the first edge surface portion 224a is flat and inclined at about 17° to the second major surface 222, the shortest distance between the first edge 226 and the third edge 232, corresponding to the length of the line r-r' in FIG. 8d, is given by $$\text{lenght line } r - r' = \frac{\text{grind depth}}{\cos (17°)} \quad (1)$$

and for a grind depth 227 of 0.7 mm this is about 0.732 mm. Since the edge surface 224 is symmetrical about line w-w', the length of line s-s' is also about 0.732 mm. In this example, the shortest distance between the third edge 232 and fourth edge 234 (the length of line r'-s' in FIG. 8c) is therefore given by $$\text{glass thickness} - 2 \times \left( \frac{\text{grind depth}}{\cos (17°)} \times \sin 17° \right) \quad (2)$$

and for a grind depth of 0.7 mm and a glass thickness of 0.55 mm this is about 0.122 mm i.e. the line r'-s' has a length of about 0.122 mm.

Therefore, the shortest distance alone the edge surface 224 between the first edge 226 and the second edge 228 is (2×0.732)+0.122 mm, which is 1.586 mm. This is about 2.88 times the thickness of the second sheet of glass 204, which in this example is 0.55 mm.

The shortest distance along the edge surface 224 between first point r on the first edge 226 and a second point s on the second edge 228 is shown in FIG. 8c as the dotted line p.

By changing the angle of inclination of the first edge portion 224a relative to the second major surface 222 and/or by changing the angle of inclination of the third edge portion 224c relative to the first major surface 220 the shortest distance between the points r and s in FIG. 8c can be changed. For example, keeping the second edge surface portions 224b the same (such that r'-s'=0.122 mm), if the angle θ is reduced from 17° to 10° then the length of the line r-r' (and s-s') lengthens from 0.732 mm to 1.232 mm (=0.214/sin(10°) mm). The shortest distance between the points r and s would therefore increase to (1.232×2+0.122 mm)=2.586 mm. This is about 4.7 times the thickness of the second glass sheet 204.

After the upper edge surface 224 has been produced, for example by a suitable edge working process, the second sheet of glass 204 may be subsequently chemically strengthened.

In another example similar to that shown in relation to FIGS. 8a-8d, the second sheet of glass 204 has the same general configuration but has a thickness of 0.70 mm. The grind depth 227 is 0.67 mm and the angle θ is also 17°. The other parts of the laminated glazing for this example are the same. For the second sheet of glass configured this way, the distance s-s' can be calculated to be 0.67/cos(17°) mm (=grind depth/cos(θ)). Hence for this example, the distance s-s' (and r'-r) is about 0.7006 mm. In this example, the distance s'-r' can be calculated to be about 0.2903 mm (using equation (2) above). Therefore, the shortest distance alone the edge surface 224 in this example between the first edge 226 and the second edge 228 is (2×0.7006 mm)+0.2903 mm, which is 1.6915 mm. This is about 2.42 times the thickness of the second sheet of glass 204, which in this example is 0.70 mm.

In another example similar to that shown in relation to FIGS. 8a-8d, the second sheet of glass 204 has the same general configuration but has a thickness of 0.55 mm. The grind depth 227 is 0.42 mm and the angle θ is also 17°. The other parts of the laminated glazing for this example are the same. For the second sheet of glass configured this way, the distance s-s' can be calculated to be 0.42/cos(17°) mm (=grind depth/cos(θ)). Hence for this example, the distance s-s' (and r'-r) is about 0.44 mm. In this example, the distance s'-r' can be calculated to be about 0.29 mm (using equation (2) above). Therefore, the shortest distance alone the edge surface 224 in this example between the first edge 226 and the second edge 228 is (2×0.44 mm)+0.29 mm, which is 1.17 mm. This is about 2.13 times the thickness of the second sheet of glass 204, which in this example is 0.55 mm.

For a C-profile edge surface having circular curvature the shortest distance between the edges would be $$\frac{1}{2} \times (2\pi) \times \left(\frac{\text{glass thickness}}{2}\right) \quad (3)$$

and for a glass thickness of 0.55 mm this equates to 0.86 mm, which is about 1.57 (=π/2) times the glass thickness.

It should be noted that in the example shown in relation to FIGS. 8a-8d the interlayer structure may be replaced by a single sheet of suitable adhesive interlayer material, or there may be no sheet of PET 212 in between the first and second sheets of PVB 208, 210, or the interlayer structure may contain more PVB sheets, with or with adjacent sheets of PET or the like.

Also, the laminated glazing 200 may be configured as a vehicle side window as shown with reference to FIGS. 1, 2 and 3-6.

In the previous examples the edges of the glass sheets are defined as the intersection between two surfaces such that the edge formed is a sharp edge, see for example FIGS. 2a and 2b. However in practice the edges may be rounded edges and this is illustrated in FIG. 2c which is a cross sectional view of a sheet of glass similar to that shown in FIG. 2a, except having rounded edges.

Figure 2C:
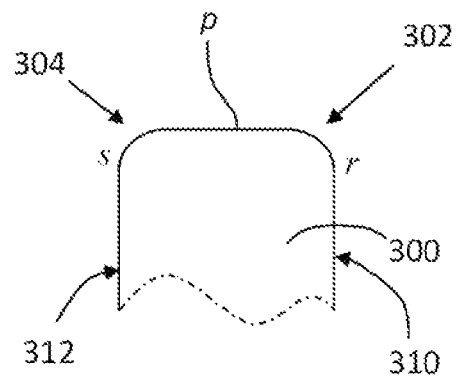

FIG. 2c shows an upper end cross sectional view of a glass sheet 300 having a first rounded edge 302 and a second rounded edge 304 and a first major surface 310 and a second opposing major surface 312. In such a situation, it is evident that the edge surface between the first and second major surfaces 310, 312 begins when there is sufficient deviation of the edge surface away from the first (and second) major surfaces 310, 312. For example, in accordance with the present invention, the first edge of the sheet of glass 300 may be defined by the start of the edge working (i.e. the start of the grind) on the first major surface 310 or the second major surface 312 of the sheet of glass 300. Likewise, the second edge of the sheet of glass may be defined by the start of the edge working (i.e. the start of the grind) on the second major surface 312 or the first major surface 310 of the sheet of glass 300.

Accordingly, a first edge of the glass sheet 300 may be defined as the intersection between the first major surface 310 and the surface of the rounded edge 302. A second edge of the glass sheet 300 may be defined as the intersection between the second major surface 312 and the surface of the rounded edge 304.

The point r lies at the start of the edge working on the second major surface 312 and the point s lies at the start of the edge working on the first major surface 310. The edge surface which extends between points r and s in such an example includes the rounded portions of the rounded edges 302, 304. In practice, if the radius of curvature of the rounded edges is small in comparison to the glass thickness, the exact position of the edge is not too critical and does not contribute significantly to the distance between opposing major surfaces of the glass sheet (the shortest distance between point r and s i.e. the length of line p). For example, the first and/or second rounded edges 302, 304 may have a radius of curvature of 0.1 mm or less.

To illustrate a method in accordance with the present invention, the production of the laminated glazing 100 is described by way of example with reference to FIGS. 7a-7d.

To produce the laminated glazing 100 shown in FIG. 7a, the first sheet of glass 102 may be cut from a larger sheet of glass and suitably edge worked to provide the edge surface 114.

The edge worked first sheet of glass 102 is then placed onto a suitable support such that the second major surface 118 faces upwards. Next the first sheet of PVB 108 is placed onto the first sheet of glass 102 such that the first sheet of PVB 108 is on the on second major surface 118. Next, a sheet of PET 112 is placed on the first sheet of PVB 108. Next a second sheet of PVB 10 is positioned on the sheet of PET 112. Next, a second sheet of glass 104 is provided. The second sheet of glass 104 is suitably edge worked to provide the edge surface 124. The edge worked second sheet of glass 104 is then preferably chemically strengthened. The edge worked second sheet of glass, which may be chemically strengthened, is then positioned on the second sheet of PVB 110 with the second edge 128 aligned with the upper edge surfaces 108', 110' and 112' to form, with the upper edge surface 114 of the first sheet of glass 102, part of the upper edge surface of the laminated glazing 100. The entire assembly is then laminated using conventional lamination conditions.

In an alternative method, after being edge worked and before being laminated, the first sheet of glass 102 is suitably toughened using a thermal toughening process or a chemically strengthening process.

Although in the previous figures the vehicle side window 1, the laminated glazing 100 and the laminated glazing 200 are shown as being flat (or planar) having a flat outer surface, the vehicle side window 1, the laminated glazing 100 or the laminated glazing 200 may be curved or bent in one or more directions. The radius of curvature in one of the one or more directions may be between 1000 mm and 8000 mm. When curved or bent in two directions, suitably each direction of curvature is orthogonal to the other. Suitably the radius of curvature in one or both directions of curvature is between 1000 mm and 8000 mm.

Suitable techniques are known for shaping the first sheet of glass. However, the second sheet of glass may be initially flat and "cold formed" to the desired shape set by the curved first sheet of glass by applying suitable pressure to the flat second sheet of glass during the lamination process. The temperature during the lamination process is sufficient to cause to the adhesive layer (i.e. a sheet of PVB) to bond to the first and second sheets of glass, but such temperature is not sufficient to cause the second sheet of glass alone to be deformed by pressing between complementary shaping members and/or sagging under the influence of gravity.

It has been found that when a laminated vehicle side window is constructed in accordance with the present invention, the upper edge region thereof has less potential to cause damage to a rubber seal or the like with which the upper exposed edge surface of the vehicle side window engages to form a seal when the vehicle side window is closed. Even though the upper edge portion of the second sheet of glass has been sharpened relative to a C-profiled edge, when the second sheet of glass is incorporated into the laminated glazing to produce the vehicle side window, the potential for such damage to the rubber seal (or other resilient sealing means or the like) is reduced.

The invention claimed is:

1. A laminated glazing comprising:
a first sheet of glass joined to a second sheet of glass by an interlayer structure therebetween, the interlayer structure comprising at least one sheet of adhesive interlayer material;
the first sheet of glass having a first major surface and a second opposing major surface;
the first sheet of glass having a thickness between 1.3 mm and 6 mm;
the second sheet of glass having a first major surface and a second opposing major surface;
the second sheet of glass having a thickness between 0.3 mm and 1.2 mm;
the laminated glazing being configured such that the second major surface of the first sheet of glass faces the first major surface of the second sheet of glass;
the first sheet of glass having a first edge surface between the first and second major surfaces of the first sheet of glass;
the second sheet of glass having a first edge surface between the first and second major surfaces of the second sheet of glass;
the first edge surface of the second sheet of glass intersecting the first major surface of the second sheet of glass to define a first edge of the second sheet of glass; and
the first edge surface of the second sheet of glass intersecting the second major surface of the second sheet of glass to define a second edge of the second sheet of glass;
wherein the first edge surface of the second sheet of glass is configured to comprise at least one region between the first and second edges of the second sheet of glass such that in the at least one region the shortest distance along a straight line on the first edge surface of the second sheet of glass connecting a first point on the first edge of the second sheet of glass to a second point on the second edge of the second sheet of glass is at least 1.7 times the thickness of the second sheet of glass.

2. A laminated glazing according to claim 1, wherein the thickness of the second sheet of glass is less than the thickness of the first sheet of glass; and/or wherein the first edge surface of the second sheet of glass comprises at least one flat portion and/or at least one concave portion and/or at least one convex portion.

3. A laminated glazing according to claim 1, wherein the first edge surface of the second sheet of glass is configured such that in the at least one region, the shortest distance along the line joining the first point on the first edge of the second sheet of glass to the second point on the second major surface of the second sheet of glass is less than ten times the thickness of the second sheet of glass.

4. A laminated glazing according to claim 1, wherein the first edge surface of the second sheet of glass comprises at least a first edge surface portion and at least a second edge surface portion, wherein the first edge surface portion of the first edge surface of the second sheet of glass is at an angle relative to the second edge surface portion of the first edge surface of the second sheet of glass.

5. A laminated glazing according to claim 4, wherein the first edge surface portion is inclined relative to the second edge surface portion at an angle of between 10° and 60°.

6. A laminated glazing according to claim 4, wherein the first edge surface of the second sheet of glass comprises a third edge surface portion between the first edge surface portion of the first edge surface of the second sheet of glass and the second edge surface portion of the first edge surface of the second sheet of glass, the third edge of the second sheet of glass being between the first and second edges of the second sheet of glass.

7. A laminated glazing according to claim 1, wherein the first edge surface portion is symmetrical about a plane of symmetry between the first and second major surfaces of the second sheet of glass and/or wherein the interlayer structure has a first edge surface, the first edge surface of the interlayer structure being at least partially aligned with the first edge of the second sheet of glass.

8. A laminated glazing according to claim 1, wherein the first sheet of glass is a sheet of thermally toughened glass or a sheet of thermally semi-toughened glass.

9. A laminated glazing according to claim 1, wherein first sheet of glass has a thickness between 1.3 mm and 1.49 mm and a surface compressive stress in at least a central region of the first major surface of the first sheet of glass in the range of 18 MPa to 23 MPa, or wherein the first sheet of glass has a thickness between 1.5 mm and 1.69 mm and a surface compressive stress in at least a central region of the first major surface of the first sheet of glass in the range of 23.1 MPa to 26 MPa, or wherein the first sheet of glass has a thickness between 1.7 mm and 1.99 mm and a surface compressive stress in at least a central region of the first major surface of the first sheet of glass in the range of 26.1 MPa to 30 MPa, or wherein the first sheet of glass has a thickness between 2.0 mm and 2.19 mm and a surface compressive stress in at least a central region of the first major surface of the first sheet of glass in the range of 30.1 MPa to 35 MPa, or wherein the first sheet of glass has a thickness between 2.2 mm and 2.49 mm and a surface compressive stress in at least a central region of the first major surface of the first sheet of glass in the range of 35.1 MPa to 45 MPa, or wherein the first sheet of glass has a thickness between 2.5 mm and 2.7 mm and a surface compressive stress in at least a central region of the first major surface of the first sheet of glass in the range of 45.1 MPa to 65 MPa, or wherein the first sheet of glass has a thickness between 2.71 mm and 6 mm and a surface compressive stress in at least a central region of the first major surface of the first sheet of glass in the range of 65.1 MPa to 150 MPa.

10. A laminated glazing according to claim 1, wherein the second sheet of glass has been chemically strengthened, and/or wherein the second sheet of glass is chemically strengthened to have a depth of layer (DOL) between 10 μm and 60 μm.

11. A laminated glazing according to claim 1, wherein the at least one region between the first and second edges of the second sheet of glass extends between the entire length of the first and second edges of the second sheet of glass.

12. A laminated glazing according to claim 1, wherein the first edge of the second sheet of glass is a rounded edge having a radius of curvature and/or wherein the second edge of the second sheet of glass is a rounded edge having a radius of curvature.

13. A laminated glazing according to claim 1, wherein
the first edge surface of the first sheet of glass intersects the first major surface of the first sheet of glass to define a first edge of the first sheet of glass; and
the first edge surface of the first sheet of glass intersecting the second major surface of the first sheet of glass to define a second edge of the first sheet of glass;
wherein the first edge surface of the first sheet of glass is configured to comprise at least one region between the first and second edges of the first sheet of glass such that in the at least one region of the first sheet of glass the shortest distance along a straight line on the first edge surface of the first sheet of glass connecting a first point on the first edge of the first sheet of glass to a second point on the second edge of the first sheet of glass is less than about 1.57 times the thickness of the first sheet of glass.

14. A vehicle having an aperture for a side window, wherein a laminated glazing according to claim 1 is movable within the aperture.

15. A method of making a laminated glazing comprising:
(i) providing a first sheet of glass, the first sheet of glass having a thickness between 1.3 mm and 6 mm;
(ii) edge working the first sheet of glass to provide the first sheet of glass with a first edge surface between a first and second major surface of the edge worked first sheet of glass;
(iii) providing a second sheet of glass, the second sheet of glass having a thickness between 0.3 mm and 1.2 mm;
(iv) edge working the second sheet of glass to provide the second sheet of glass with a first edge surface between a first and second major surface of the edge worked second sheet of glass, the first edge surface of the second sheet of glass intersecting the first major surface of the edge worked second sheet of glass to define a first edge of the edge worked second sheet of glass, and the first edge surface of the second sheet of glass intersecting the second major surface of the edge worked second sheet of glass to define a second edge of the edge worked second sheet of glass;
(v) positioning an interlayer structure comprising at least one sheet of adhesive interlayer material between the edge worked first sheet of glass and the edge worked second sheet of glass, the first edge surface of the first sheet of glass and first edge surface of the second sheet of glass being arranged to be common with an edge surface of the laminated glazing; and
(vi) joining the first sheet of edge worked glass to the second sheet of edge worked glass;
wherein the first edge surface of the edge worked second sheet of glass is configured to comprise at least one region between the first and second edges of the edge worked second sheet of glass such that in the at least one region the shortest distance along a straight line on the first edge surface of the edge worked second sheet of glass connecting a first point on the first edge of the edge worked second sheet of glass to a second point on the second edge of the edge worked second sheet of glass is at least 1.7 times the thickness of the second sheet of glass.

16. A method according to claim 15, wherein the first edge surface of the edge worked second sheet of glass comprises at least one flat portion and/or at least one concave portion and/or at least one convex portion.

17. A method according to claim 15, wherein following the edge working of the first sheet of glass, the first sheet of glass is bent in one or more direction using a shaping process, the shaping process comprising heating the edge worked first sheet of glass to a temperature suitable for bending, then bending the heat softened first sheet of glass, then cooling the bent first sheet of glass for subsequent use in the positioning of the interlayer structure between the edge worked first sheet of glass and the edge worked second sheet of glass.

18. A method according to claim 15, wherein following the edge working of the first sheet of glass, the first sheet of glass is chemically strengthened or thermally strengthened and/or wherein following the edge working of the second sheet of glass, the edge worked second sheet of glass is chemically strengthened or thermally strengthened.

19. A method according to claim 15, wherein the second sheet of glass is an alkali aluminosilicate glass composition and/or wherein the second sheet of glass comprises at least 6% by weight Al2O3 and/or wherein following the edge working of the second sheet of glass, the edge worked second sheet of glass is chemically strengthened to have a surface compressive stress greater than 400 MPa and/or wherein following the edge working of the second sheet of glass, the edge worked second sheet of glass is chemically strengthened to have a surface compressive stress of around 900 MPa and/or wherein following the edge working of the second sheet of glass, the edge worked second sheet of glass is chemically strengthened to have a depth of layer (DOL) between 10 μm and 60 μm.

20. A method according to claim 15, wherein the first edge surface of the edge worked second sheet of glass is configured such that in the at least one region the shortest distance along a straight line on the first edge surface of the edge worked second sheet of glass connecting a first point on the first edge of the edge worked second sheet of glass to a second point on the second edge of the edge worked second sheet of glass is less than 15 times the thickness of the second sheet of glass.

* * * * *